(12) United States Patent
Harriman

(10) Patent No.: US 11,775,470 B2
(45) Date of Patent: Oct. 3, 2023

(54) TRANSACTION LAYER PACKET FORMAT

(71) Applicant: Intel Corporation, Santa Clara, CA (US)

(72) Inventor: David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 654 days.

(21) Appl. No.: 16/831,634

(22) Filed: Mar. 26, 2020

(65) Prior Publication Data
US 2020/0226091 A1 Jul. 16, 2020

Related U.S. Application Data

(60) Provisional application No. 62/938,096, filed on Nov. 20, 2019.

(51) Int. Cl.
*G06F 13/42* (2006.01)
(52) U.S. Cl.
CPC .. *G06F 13/4282* (2013.01); *G06F 2213/0026* (2013.01)

(58) Field of Classification Search
CPC .............. G06F 13/4282; G06F 2213/0026
See application file for complete search history.

(56) References Cited

U.S. PATENT DOCUMENTS

| | | | |
|---|---|---|---|
| 11,232,058 B2 * | 1/2022 | Jen | G06F 1/3278 |
| 11,362,934 B2 * | 6/2022 | Oprea | H04L 45/26 |
| 2003/0182591 A1 | 9/2003 | Ajanovic et al. | |
| 2010/0260206 A1 | 10/2010 | Harriman | |
| 2016/0283303 A1 * | 9/2016 | Sharma | G06F 11/0772 |

* cited by examiner

*Primary Examiner* — Zachary K Huson
(74) *Attorney, Agent, or Firm* — Alliance IP, LLC

(57) ABSTRACT

A device includes protocol logic to determine a packet type for a packet and generate and send the corresponding packet. The packet includes a packet header with a header base, the header base including a type field and a header content field. The type field indicates the packet type and the header content field indicates which of a plurality of header content blocks is to be included in the packet header with the header base. Information in fields of the header base indicate a total length of the packet.

21 Claims, 21 Drawing Sheets

| Byte Offset |
|---|
| PCI Express Extended Capability Header — +000h |
| Uncorrectable Error Status Register — +004h |
| Uncorrectable Error Mask Register — +008h |
| Uncorrectable Error Severity Register — +00Ch |
| Correctable Error Status Register — +010h |
| Correctable Error Mask Register — +014h |
| Advanced Error Capabilities and Control Register — +018h |
| Header Log Register DW1-4 — +01Ch, +020h, +024h, +028h |
| Root Error Command Register — +02Ch |
| Root Error Status Register — +030h |
| Correctable Error Source Identification Register \| Error Source Identification Register — +034h |
| Header Log Register DW5-11 — +038h, +03Ch, +040h, +044h, +048h, +04Ch, +050h |

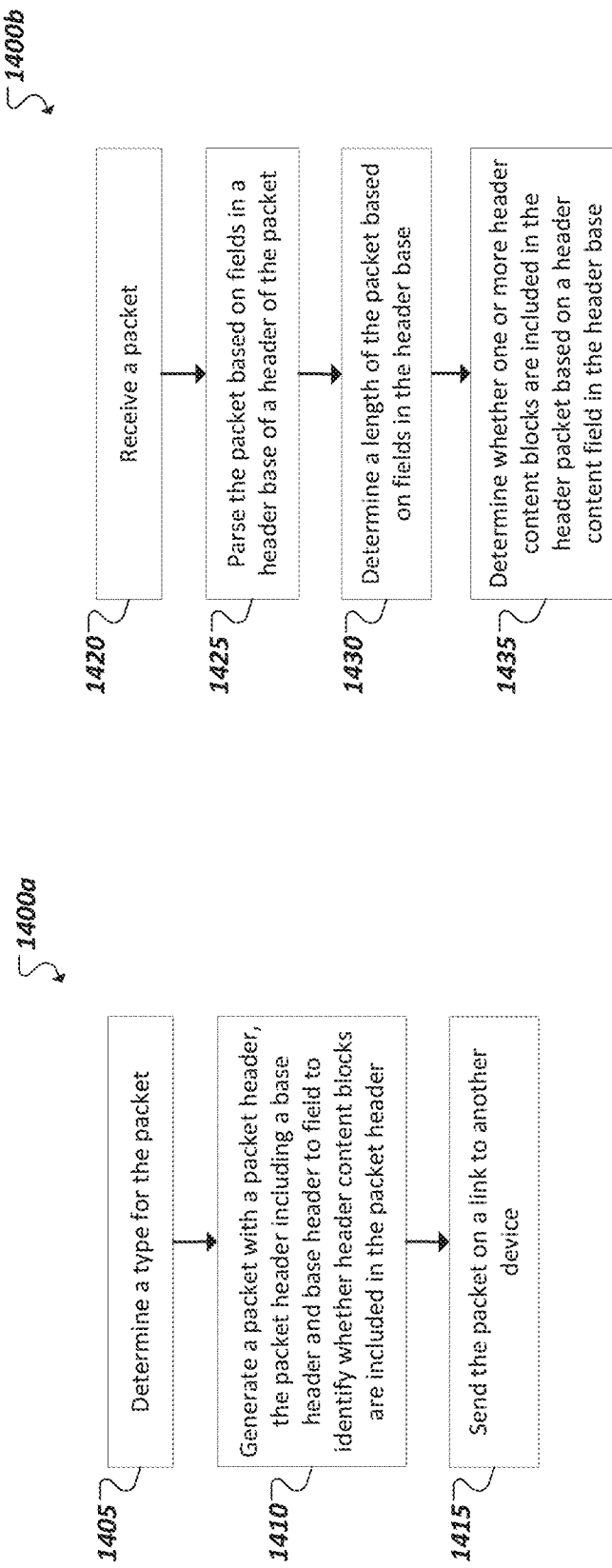

TRANSACTION LAYER PACKET FORMAT

This application claims benefit to U.S. Provisional Patent Application Ser. No. 62/938,096, filed Nov. 20, 2019 and incorporated by reference herein in its entirety.

FIELD

This disclosure pertains to computing system, and in particular (but not exclusively) to computer interfaces.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc. As the processing power grows along with the number of devices in a computing system, the communication between sockets and other devices becomes more critical. Accordingly, interconnects, have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures. Interconnect architectures may be based on a variety of technologies, including Peripheral Component Interconnect Express (PCIe), Universal Serial Bus, and others.

BRIEF DESCRIPTION OF THE DRAWINGS

FIG. 13 illustrates an example error reporting capability structure.

FIGS. 14A-14B are flowcharts illustrating example techniques for generating and parsing a packet sent over a link.

DETAILED DESCRIPTION

Figure 1:
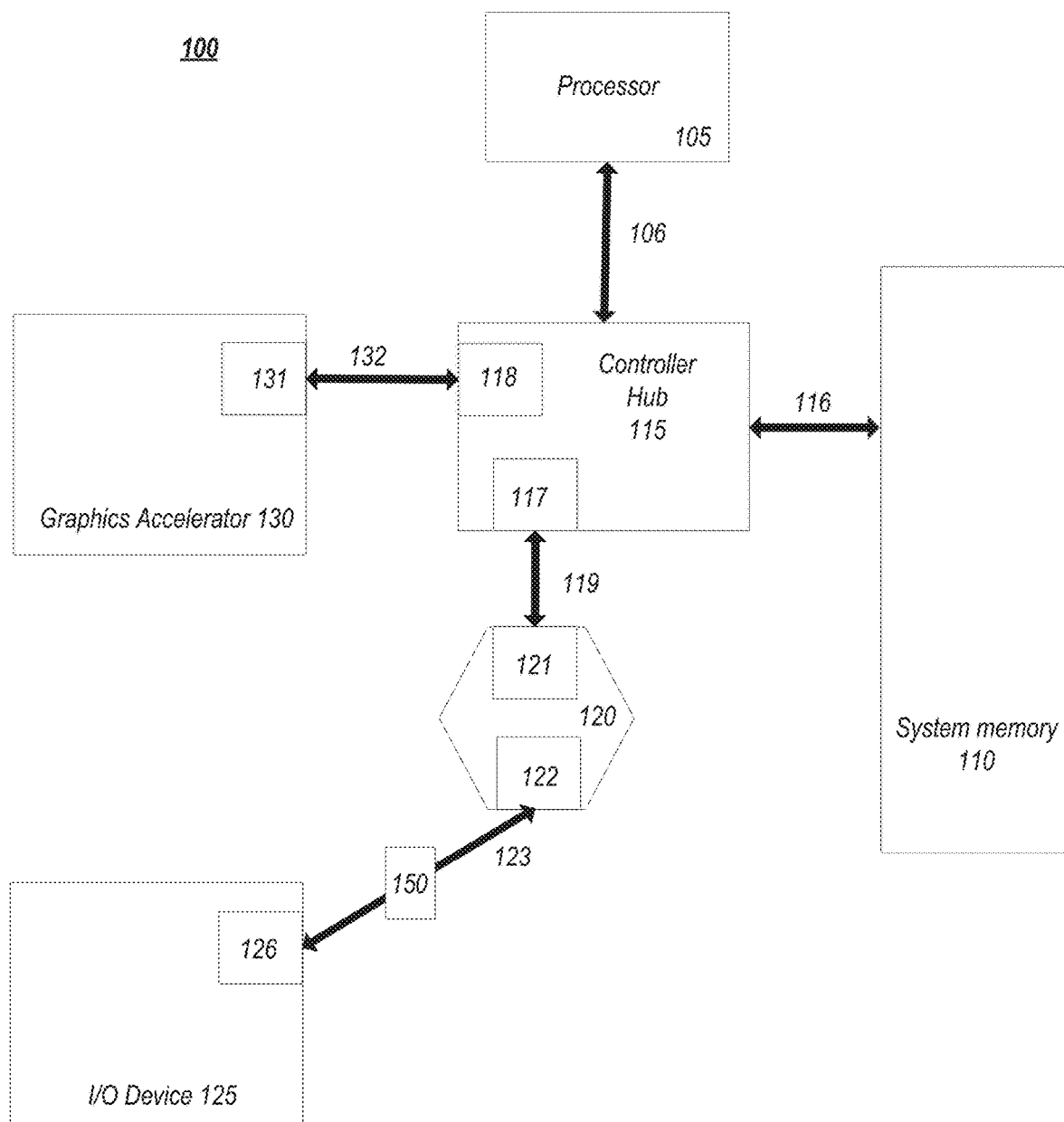
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the principles and solutions discussed in this disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the solutions described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, solid state memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. It should be appreciated that one or more of the components (e.g., 105, 110, 115, 120, 125, 130) illustrated in FIG. 1 can be enhanced to execute, store, and/or embody logic to implement one or more of the features described herein.

Figure 2:
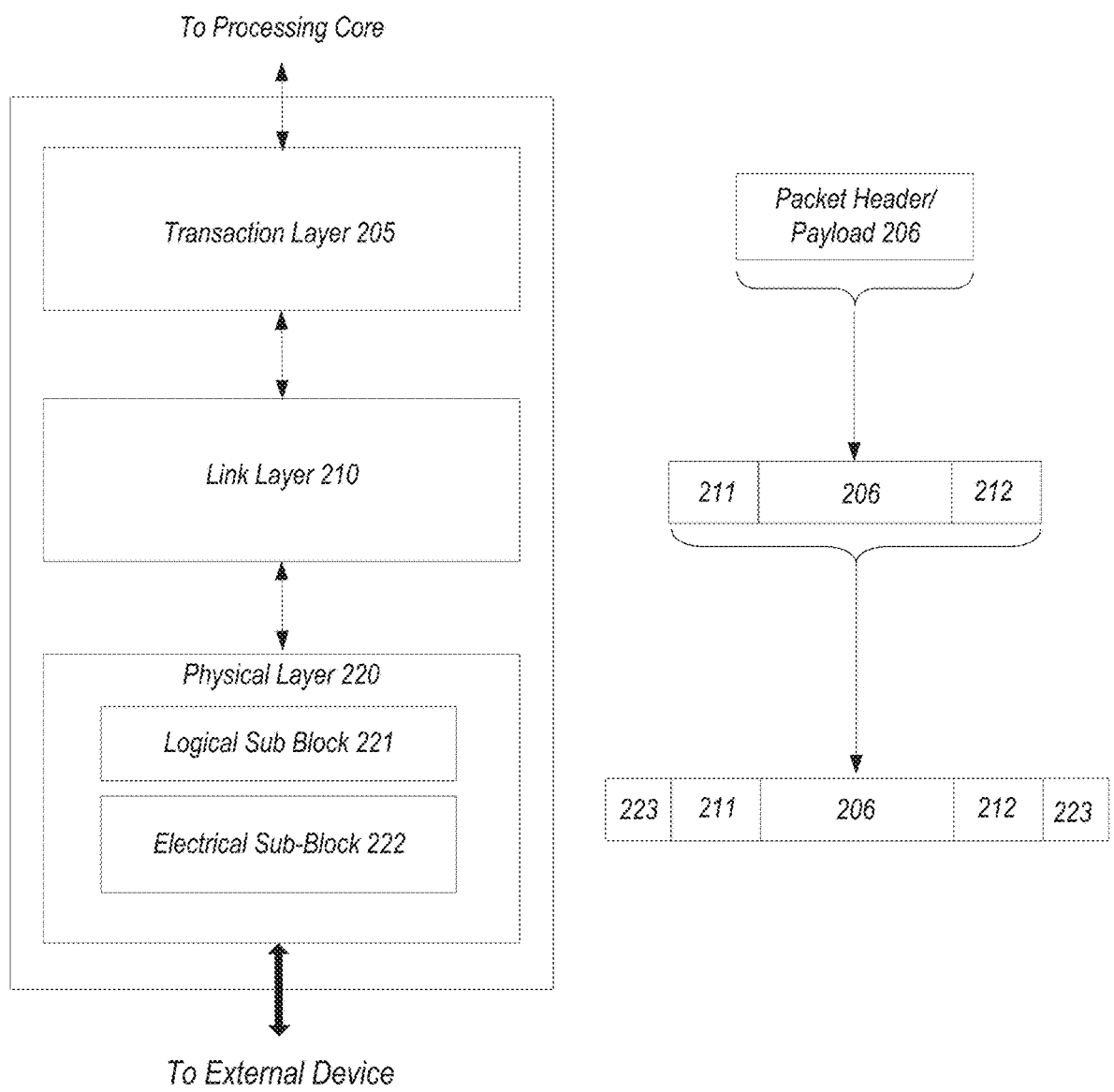
FIG. 2 illustrates an embodiment of an interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
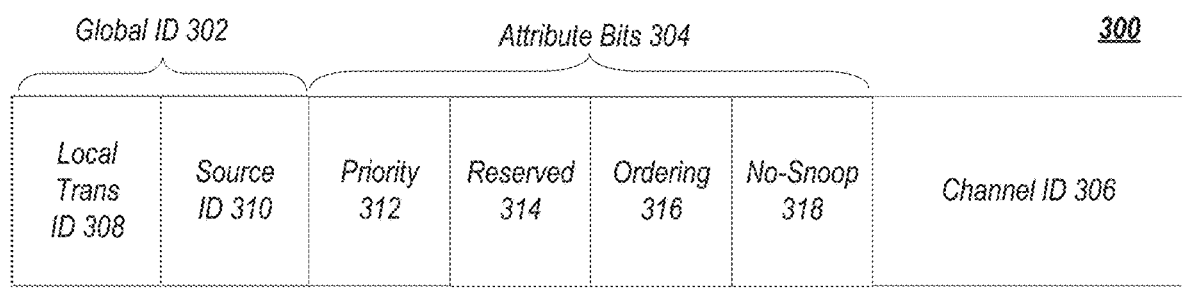
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
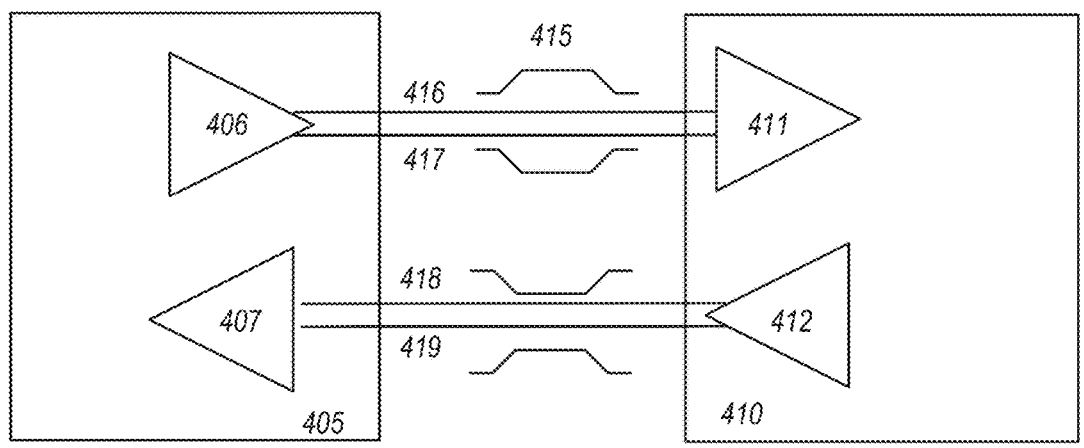
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/412 and a receive pair 411/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., PCIe), while others (e.g., Displayport) may not and may even including only transmit or only receive pairs, among other examples.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In PCIe, rapid advancements are taking place as the protocol evolves from generation 4.0 to generations 5.0 and 6.0. PCIe 4.0 may support 16 lane links with effective bandwidths of 64 GB/s and extended support for retimers and other features. PCIe 5.0 maintains the 16 lane link width, while doubling the effective bandwidth to 128 GB/s. To maintain these advances in bandwidth, PCIe 6.0 preserves the 16 lane link and adopts pulse amplitude modulation (PAM) encoding (e.g., PAM4 encoding), as opposed to PCIe's traditional non-return-to-zero (NRZ) encoding (e.g., 8b/10b, 128b/130b), to increase the number of bits that may be sent on a serial channel within a single unit interval (UI). Accordingly, PCIe 6.0 further doubles bandwidth to 64 GT/s from 32 GT/s in PCIe 5.0 thereby enabling 256 GB/s of bidirectional bandwidth. Such links may be valuably applied to couple devices such as a deep learning and artificial intelligence hardware accelerator devices; high speed graphic processor units, tensor processor units, and other deep learning processors; high-speed memory; and other hardware in a variety of emerging computing applications, from deep learning applications, autonomous vehicles, robotics, and high performance memory architectures, among other examples. PCIe 6.0 further includes low-latency Forward Error Correction (FEC) and other features to improve bandwidth efficiency, while maintaining backward compatibility with previous PCIe generations and similar channel reach to what is available in PCIe 5.0.

While high-speed PAM4 encoding allows links to realize new and improved applications, such links may be more susceptible to errors. In some implementations, a link and corresponding protocol may be configured to operate in multiple modes, such as a flit mode when high-speed PAM4 encoding is utilized and another (e.g., non-flit) mode when lower speed encoding (e.g., 8b/10b, 128b/130b NRZ) is used. For instance, a higher speed mode may utilize and particularly benefit from Forward Error Correction. Accordingly, a flit mode may be implemented, which subdivides the transmission of a single packet into a set of one or more defined flow control units, or "flits," at the data link or logical PHY layer. However, such features may complicate parsing of the packet at the receiver. Each flit may include a respective header with information corresponding to the flit and packet, allowing some information traditionally reserved for the packet header to be omitted when redundant. In some implementations, two (or more) separate packet header formats may be defined for an interconnect (e.g., for PCIe 6.0-based interconnects), where a first packet header format is utilized for a mode utilizing flits for the packet transfer, and a different, second packet header format is utilized for a mode that does not utilize flits (e.g., a legacy mode defined in the protocol), among other example implementations. In some implementations it may be desirable to utilize flits for packet transfer when operating in lower speed modes (e.g., 8b/10b, 128b/130b NRZ).

In the case of PCIe, the transaction layer packet (TLP) header structure has evolved slowly but remained mostly unchanged. With the adoption of PAM4 encoding and a shift to flit-based data integrity with PCIe 6.0, a new, revised TLP header format may be utilized. The new, flit-mode TLP header may also address the reality that existing PCIe TLP headers lacks remaining reserved bits to expand the features and information, which may be communicated in corresponding packet header fields. In one example implementations, a flit-mode TLP header may replace the traditional, orthogonal, Format (Fmt) and Type fields to a fully-decoded 8-bit TLP Type field, which may be encoded with values to indicate all (or considerably all) existing TLP Types in PCIe, while adding new TLP types for no-op (NOP) and End Bad (EDB) packets types. Indeed, with flit mode, any number of NOP TLPs may be transmitted before or after any other TLP, with NOP TLPs discarded without effect by the receiver. Further the flit-mode TLP header may add new expanded header elements to include what had previously been communicated using TLP Prefixes and other mechanisms in PCIe, including Process Address Space Identifier (PASID), TLP Processing Hints, and Secure TLPs, among other examples. Other example modifications may include the addition of an 8-bit Segment ID (SBDF) to Requester and Completer ID, increasing the Tag field bits (e.g., 12, 14, or 16 bits), removing outdated fields and elements (e.g., the "Byte Count" field), among other example modifications.

Among the example benefits, which may be realized through a flit-mode packet header, the header may provide the ability for the receiver's transaction layer to robustly parse incoming TLP content without relying on TLP demarcation information from the Physical or Data Link Layers. As another example, extensibility of packets may be better facilitated via a flexible TLP structure consisting of a TLP Header Base followed by flexibly added additional header content (e.g., zero to 7 additional double words (DW) of content). In one example, the PCIe Transaction Digest may be replaced in flit mode packets by a "Trailer" of zero to 3 DW. In some implementations, the first DW of the Header Base includes all information requisite to determine the full size of the TLP, including the Header itself, any data payload, and the Trailer, if present. The End Bad (EDB) and Poisoned TLP mechanisms may also be modified, and in flit mode indicated via Suffixes which, if present, immediately follow the TLP to which they apply, and which, for Poisoned, are conveyed end-to-end with the TLP through Root Complexes that support peer-to-peer and all switches. Further, all TLP Type encodings defined for flit mode headers may be assigned flow control and routing for "forwards compatibility," such that new opcodes can be allocated without requiring modification to existing switch and the generic blocks of PCIe controller hardware.

Figure 5:
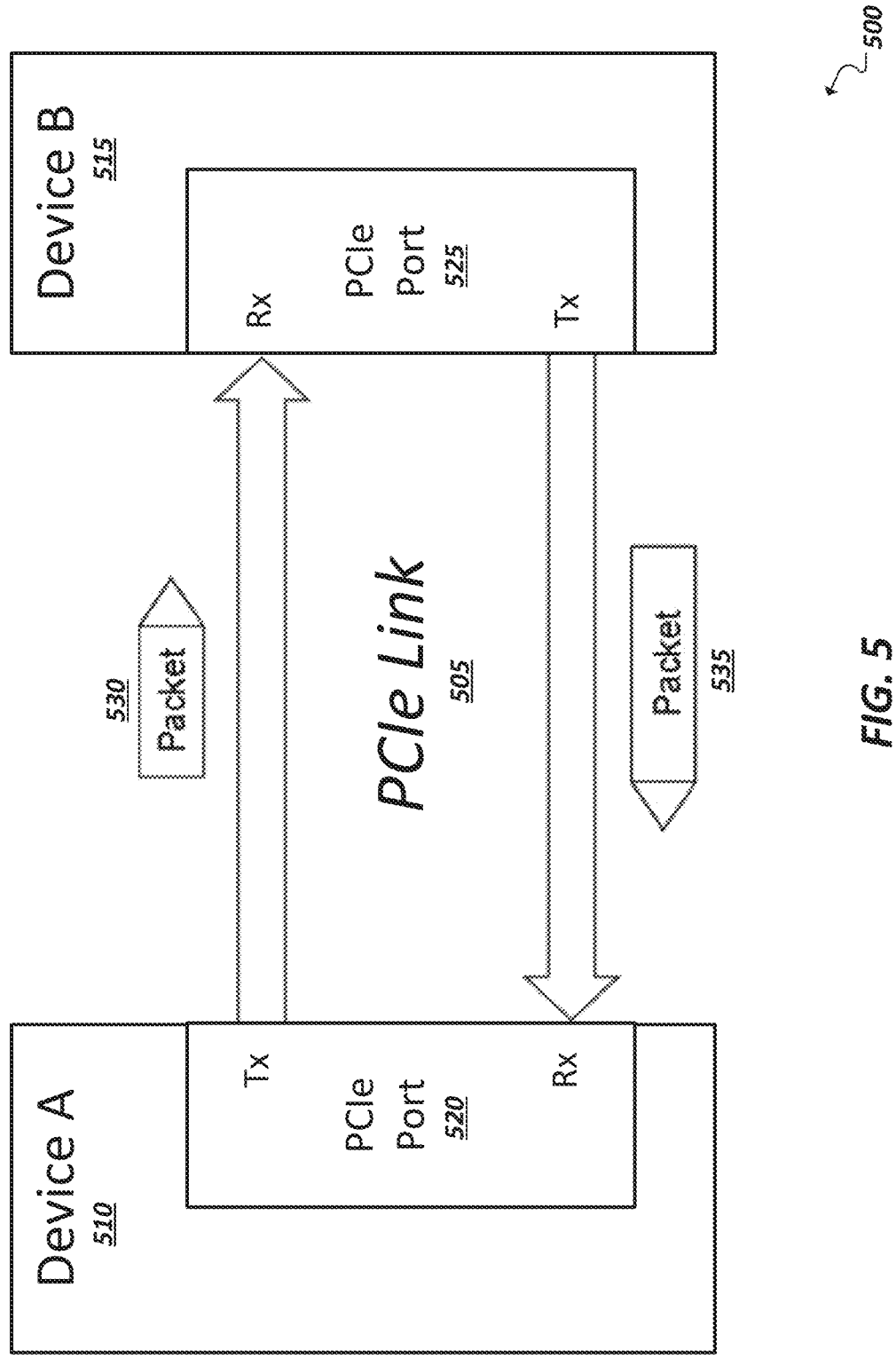
FIG. 5 illustrates a first device coupled to a second device by an example link.

Turning to FIG. 5, a simplified block diagram 500 is shown illustrating an example PCIe link 505 coupling a first device 510 to a second device 515. Each of the devices 510, 515 may be equipped with one or more multiple ports (e.g., 520, 525) to support one or more multiple connections to other devices (e.g., on the same or different die or package). The port (e.g., 520, 525) may include transmit and receive circuitry as well as logic (e.g., implemented in hardware circuitry) to implement one or more interconnect protocols governing operation of a corresponding connection. For instance, ports 520, 525 may each include circuitry to implement a layered protocol stack of a PCIe-based protocol. The PCIe protocol (e.g., PCIe 6.0) may support both a flit mode and another non-flit mode. The corresponding protocol circuitry (e.g., of ports 520, 525) may be utilized to generate packets (e.g., 530, 535) with packet headers according to each of the flit mode and non-flit mode, such as discussed in the examples herein. Likewise, protocol logic at the devices 510, 515 (e.g., corresponding to the receivers of the ports 520, 525) may receive packets (e.g., 530, 535) generated and sent by another device and utilize information within the packets to identify boundaries of the packet and parse the packet and its contents (e.g., using fields such as discussed in the examples below).

As introduced above, in flit mode, the link may be configured to robustly parse incoming TLP content without relying on TLP demarcation information from the Physical or Data Link Layers. In addition, flit mode PCIe TLP headers may include several changes over traditional PCIe TLP headers to improve extensibility compared to these non-FLIT mode header structures where all reserved bits are consumed. Indeed, in some cases, the lack of remaining space in traditional PCIe TLP headers may result in implementations where information is mixed between the header itself and TLP prefixes, among other example issues. In an example flit mode, link local TLP prefixes may be preserved, but end-to-end TLP prefixes are removed and replaced with a more flexible TLP structure consisting of a defined TLP header base optionally followed by 0-7 additional DW of header content. Further, in some implementations, the PCIe Transaction Digest mechanism is replaced by a "Trailer" of 0-3 DW. In one example, the first DW of the flit mode header base may be formatted to include all information requisite to determine the full size of the TLP, including the header itself, any data payload, and any trailer if present.

Additional features may be provided in an example flit mode TLP format. For instance, PCIe End Bad (EDB) and Poisoned TLP mechanisms may be modified in flit mode and indicated via suffixes which, if present, immediately follow the TLP to which they apply, and which, for Poisoned, are conveyed end-to-end with the TLP through root complexes that support peer-to-peer and all switches. In some cases, in flit mode, the transmitter is to finish an entire TLP transmission in the sense that it is to transmit something in each indicated position including payload and trailer and not attempt to end TLP transmission early. In such cases, the transmitter is to transmit "filler" content if needed to fill out the full TLP size indicated at the start of transmission (e.g., in fields of the TLP's header based on the transmitter running out of content to send) and then follow that transmission with an EDB suffix. In other cases, errors in a TLP may be indicated through an EDB suffix (or other fields), and corresponding receivers may discard without effect all TLPs with such EDB designations, among other example features.

Figure 6:
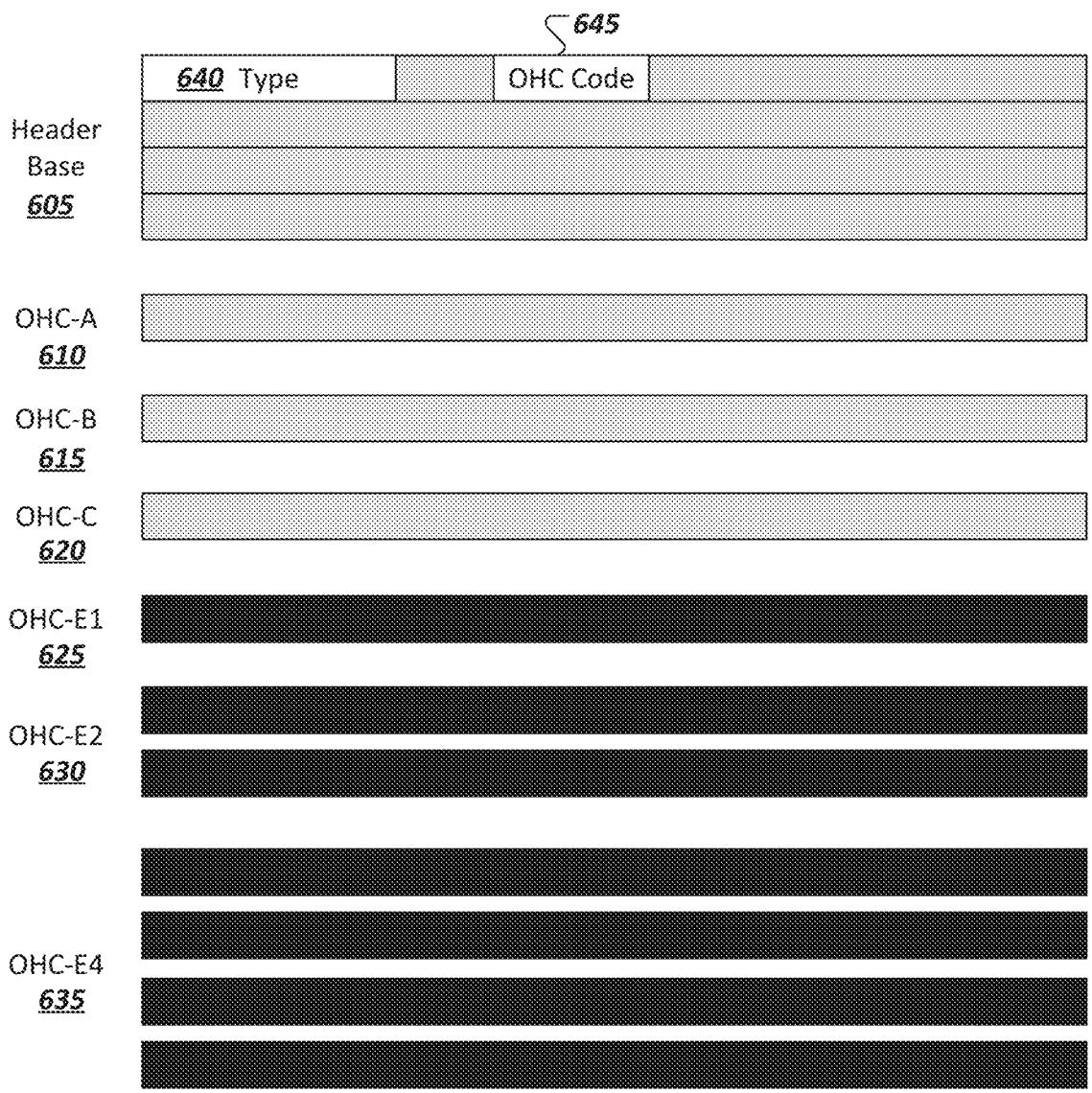
FIG. 6 illustrates an example packet format.

Turning to FIG. 6, a representation 600 is illustrated of an example flit-mode packet (e.g., TLP) format. For instance, the flit-mode packet format may include a header base 605 composed of a set of fields (e.g., 640, 645) that may be parsed by a receiver to determine an overall length of the packet, as well as other information, such as an identifier of the source of the packet, address information (e.g., for a destination of the packet), a transaction identifier, among other example information. The fields and format of the header base 605 may be based on and correspond to the type of packet. For instance, the headers of some packet types may have varying lengths (e.g., 3 DW or 4DW), combinations and types of fields, and other varying characteristics corresponding to the packet type. Some header fields may be present in headers of each packet type, such as a type field (e.g., 640) to indicate the packet type, among other examples.

In the example of FIG. 6, in addition to a header base, additional fields may be selective added to the header as header content blocks, or "orthogonal header content (OHC)". In one example, a set of header content blocks may be selectively appended to the header base 605 to form the complete header for a packet. For instance, one, more than one, or none of the header content blocks may be appended to the header base based on an encoding of an orthogonal header content (OHC) field (e.g., 645) in the header base 605. In some implementations, the OHC field may use one-hot encoding or another encoding technique to identify which (if any) of the header content blocks (e.g., 610, 615, 620, 625, 630, 635) are to be included in the header. Fields of the header and/or header content blocks may further identify the length of the remaining packet (e.g., the packet payload), the presence and character of suffixes, trailers, and/or prefixes included in the packet, among other packet components.

In some instances, the transaction layer packet grammar of a flit-mode packet may be defined to include zero or more 1DW of local TLP prefixes, a TLP header base (e.g., 3DW or 4DW based on the packet type), a TLP data payload (e.g., of 0 to 1024 DW), a TLP trailer (if present), 0 or more 1DW end-to-end suffixes, etc. Fields of the packet header (e.g., of the header base or one or more of the header content blocks) may identify length of the payload, the combination of header content blocks includes, the presence and character of prefixes, trailers, suffixes, and other information to allow a receiver to parse the header and determine the length of the header and the packet.

In one example implementation, one or more of the header content blocks (e.g., 610, 615, 620, 625, 630, 635) may have a variable length, the length of which may also be indicated in a field of the header base. For instance, two or more types of header content blocks (e.g., OHC-A (610), OHC-B (615), OHC-C (620), and OHC-E) may be defined. At least one of the header content block types (e.g., OHC-E) may have multiple possible lengths (e.g., 625, 630, 635). In one example, a 5-bit OHC field may be defined in the header base (e.g., in a first DW of the header base) to identify the header content blocks to be appended to the header base. In one example, encodings may be defined for the OCH field (e.g., OHC[4:0]) such as:

00000b=No OHC present
xxxx1b=OHC-A present
xxx1xb=OHC-B present
xx1xxb=OHC-C present
00xxxb=No OHC-Ex present 01xxxb=OHC-E1 present
10xxxb=OHC-E2 present
11xxxb=OHC-E4 present
where an 'x' indicates that either a 1 or a 0 may be present, and these encodings are not mutually exclusive.

It may be permitted for any combination of header content blocks to be present in the header (e.g. OHC-B and OHC-C present without OHC-A or OHC-E). In some implementations, when two or more header content blocks are designated to be included in the header, the header content blocks may be defined to be present within a defined order (e.g., header content blocks following the header base and then in OHC-A, OHC-B, OHC-C, OHC-E order). In some implementations, the contents of a header content block may vary depending on the TLP type (such as shown in the examples of FIGS. 7B, 8B, 9B, 10B, 11B, 12B).

In some implementations, when TLP Processing Hints (TPH) are used (e.g., in Memory Routed Request TLPs) an OHC-B header content block includes appropriate processing hint (PH), steering tag (ST), Address Translation Service (ATS) memory attribute (AMA), and AMA valid (AV) values, among other examples. In some implementations, unlike a non-FLIT mode header, a ST field in a flit-mode packet is not overlaid with byte enables or other fields. When OHC-B is included, if TPH is not being used the PH and ST fields may be encoded with all 0's.

In some cases, memory request packets that use byte enables to express the address/range of bytes to be read/written, and/or use a process address space identifier (PASID) may incorporate such fields through a particular header content block (e.g., OHC-A). As a corollary, memory requests that do not require the use of byte enables to express the address/range of bytes to be read/written, and do not require PASID, may omit the particular header content block (e.g., OHC-A). In some implementations, when such a particular header content block is When OHC-A is included with a TLP, if byte enables apply to the TLP type, then the values in the byte enable fields may be encoded to accurately indicate the enabled bytes. Further, if the PASID is not known or has not been assigned when the particular header content block (e.g., OHC-A) is included, then the PASID field value of the particular header content block may be all 0's.

Some types of packets or transactions may always involve the inclusion of one or more defined header content blocks. For instance, IO Requests and Configuration Requests may always utilize OHC-A blocks with byte enables in their packet headers. As another example, Message Requests may always include a particular header content block (e.g., OHC-B) with a Message Code[7:0] field, among other examples. For instance, Configuration Requests may always include a OHC-B block that includes a Destination Segment field. In such cases, a root complex indicates the correct segment value in Destination Segment field (e.g., even if only one Segment is implemented). The completer then captures the segment value indicated in Destination Segment, along with the Bus, Device, Function (BDF) value assigned, and returns this as its Completer Segment value when the Completer Segment is used (e.g., similarly to the way BDF is returned today (e.g., as a Segment, Bus, Device, Function (SBDF) value)). Accordingly, in some implementations, all Configuration Completions may also include a OHC-B block with both Requester Segment and Completer Segment fields. In some instances, if the captured segment number is non-zero, then all subsequent TLPs are to include the OHC-B block in their headers with the captured Requester/Completer Segment value. For a request, if the Requester Segment is non-zero, then all Completions for the Request are to include OHC-B with Requester Segment and Completer Segment values. The Destination Segment field may be held as reserved for TLPs other than Configuration Requests in some implementations.

In some cases, one or more header content blocks (e.g., OHC-C) may be provided and defined for use in facilitating data security, such as through fields to enable data integrity, data encryption, and other features (e.g., to support emerging integrity and data encryption features of PCIe). Accordingly, secure TLPs may include such header content blocks to facilitate the desired (or required) level of security or other enhancements, among other example header content blocks.

FIGS. 7A-12B illustrate examples of the respective non-flit mode and flit-mode packet header formats for each of a number of example transactions or packet types. In one example, non-flit mode packet header formats may be based (or even fully adopt) a legacy packet format (e.g., an existing PCIe packet header format). While type may affect the overall length and some of the fields included in the corresponding header base for the packet's header, the header base of a flit-mode packet header may be based on a set of common principles and/or include a common set of fields. In one example, all flit-mode TLPs, regardless of type, may include a fully-decoded 8b packet Type field, a Tag field, an OHC field, Trailer Size fields, among other examples. All Type encodings may have a defined Header size and Flow Control parameters. Tag fields in a flit-mode TLP header base may be expanded relative to a non-flit Tag[ ] field (e.g., 12 or more bits (e.g., 14 bits)). The flit-mode header base format may preserve a portion of the general layout of the non-flit mode header for some fields, but consolidate bits of some fields to free bits for expansion of the Tag field. Byte Enable values included in non-flit mode packet headers may be moved out of the header base of flit-mode packets and included only when needed through the selected inclusion of a corresponding one or more header content blocks (as indicated in the OHC field). Similarly, Byte Count fields, LowerAddress fields, Byte Count Modified (BCM) bits, and other fields traditionally included in non-flit mode headers may be removed and even entirely done away with in flit mode headers (e.g., not included in any header content block definition), or they may be included through the use of other OHC field definitions.

In addition to the features above, flit-mode headers may further include segment identifiers (e.g., an 8-bit SBDF value) in Requester and Completer identifiers. End-to-end TLP prefixes may be incorporated within the header, either as "first class" or as additional information selectively included at the end of the header. PASID values may be permitted to be applied to all flit-mode memory operations. Steering Tags in flit-mode may be un-overloaded, and PH, Steering Tags, and AMA/AV fields may be consolidated. Lightweight Notifications (LN) may be removed within flit-mode packets (and the LN mechanism deprecated). Trailers may be indicated through encodings of a Trailer Size field to assist receivers in determining the length and features of the packet. As an example, the following encoding may be defined to indicate the use and size of trailers within a corresponding packet:

```
00b - No Trailer
01b - 1DW Trailer containing ECRC
10b - 2DW Trailer - Content Reserved
11b - 3DW Trailer to be used for TLP Security mechanism
``` among other examples. In some instances, switches and root complexes may be provided with additional circuitry or logic to support peer-to-peer implementations, mapping between flit-mode and non-flit-mode TLPs.

Several features may remain common or similar between flit-mode packets and non-flit-mode packets. For instance, for Message Requests, the definitions of the contents of bytes 8-15 may be unchanged from non-flit mode. ATS Translation Requests may follow the Memory Read formats (e.g., with AT=01b distinguishing a Translation Request) unchanged from a defined non-flit mode. Similarly, the format of the Translation Completion Data Entry may be unchanged from a previously defined non-flit mode. Additionally, local TLP Prefixes may be substantially unchanged over those defined in a non-flit mode, among other features. In some implementations, if the captured segment number is non-zero, then the ATS Invalidate Request, Invalidate Completion, Page Request, Stop Marker, and PRG Response Messages may include a particular header content block with Requester/Completer Segment (e.g., OHC-B).

Figure 7A:
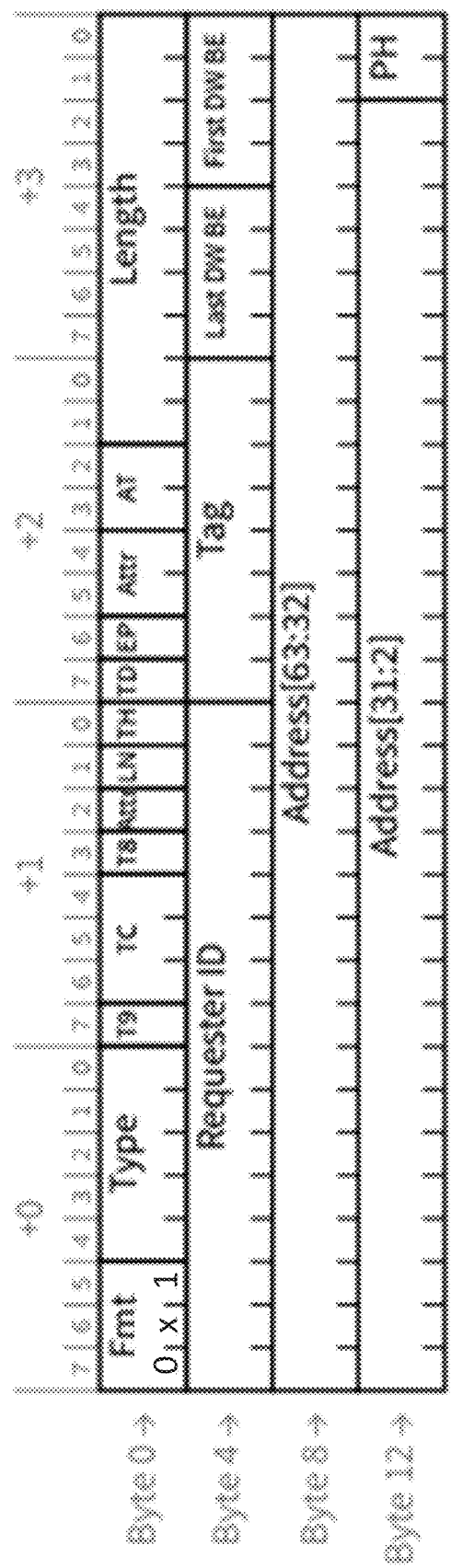
FIGS. 7A-7B illustrate example request packet headers for each of two example modes.
Figure 7B:
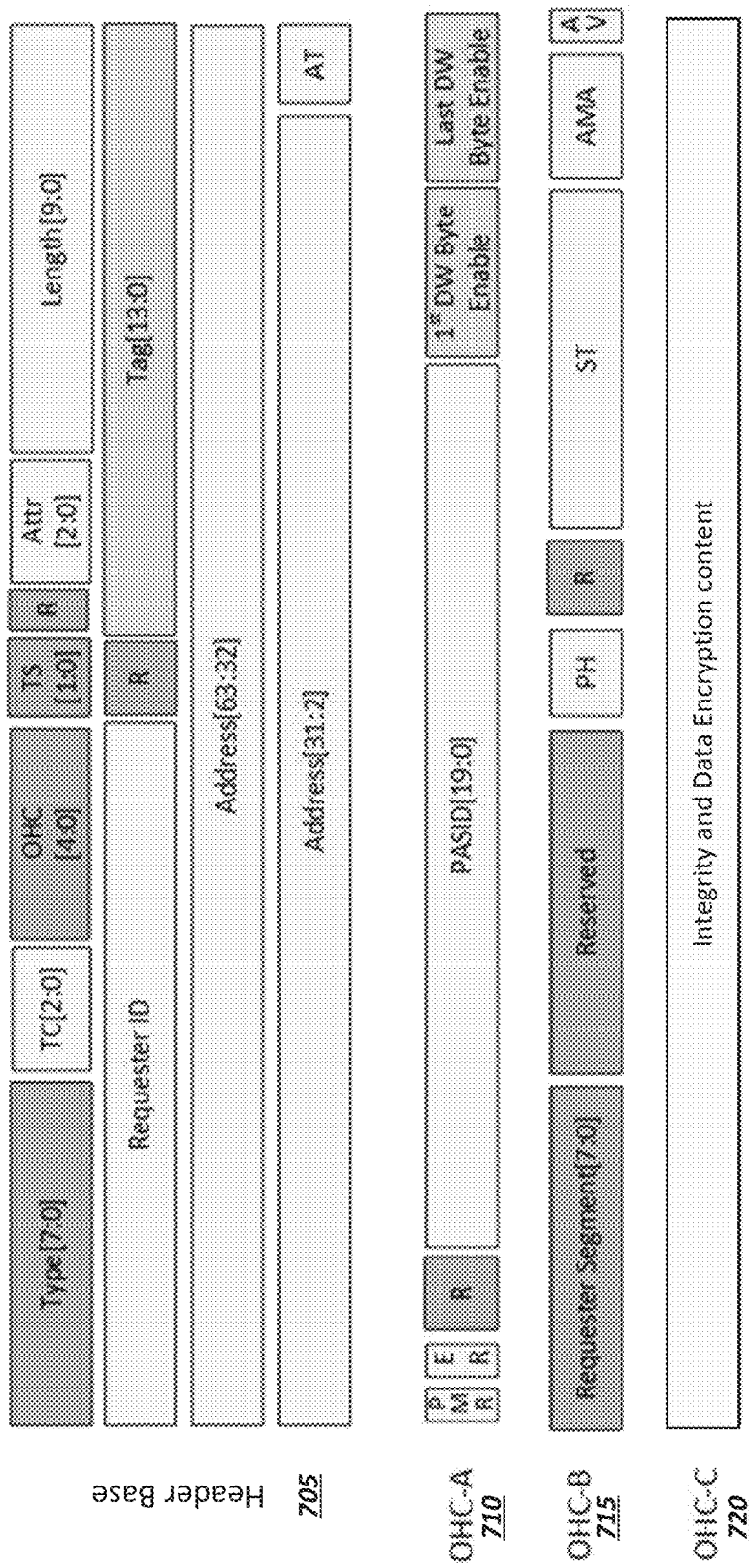

FIG. 7A illustrates a non-flit mode header format for a non-flit mode PCIe request header format for 64-bit addressing including traditional PCIe TLP header fields such as a 3-bit Format field, 5-bit Type field, Traffic Class (TC) field, LN bit, TLP Hint (TH) bit, TLP Digest (TD) field, Address Type (AT) field, Error Poisoned (EP) field, Attribute (Attr) fields, Length field, Requester ID field, and Address fields. FIG. 7B illustrates a flit-mode header format for a PCIe request header format for 64-bit addressing. The flit-mode header base 705 includes the flit-mode Type, OHC, and TS fields and expanded flit-mode Tag, together with traditional Requester ID, Attr, AT, Length, and Address fields. FIG. 7B further shows content header blocks (e.g., OHC-A 710, OHC-B 715, OHC-C 720) defined for request type packets. (Fields designated as "R" or "Reserved" in the examples of FIGS. 7A-12B indicate reserved fields/bits.)

Figure 8A:
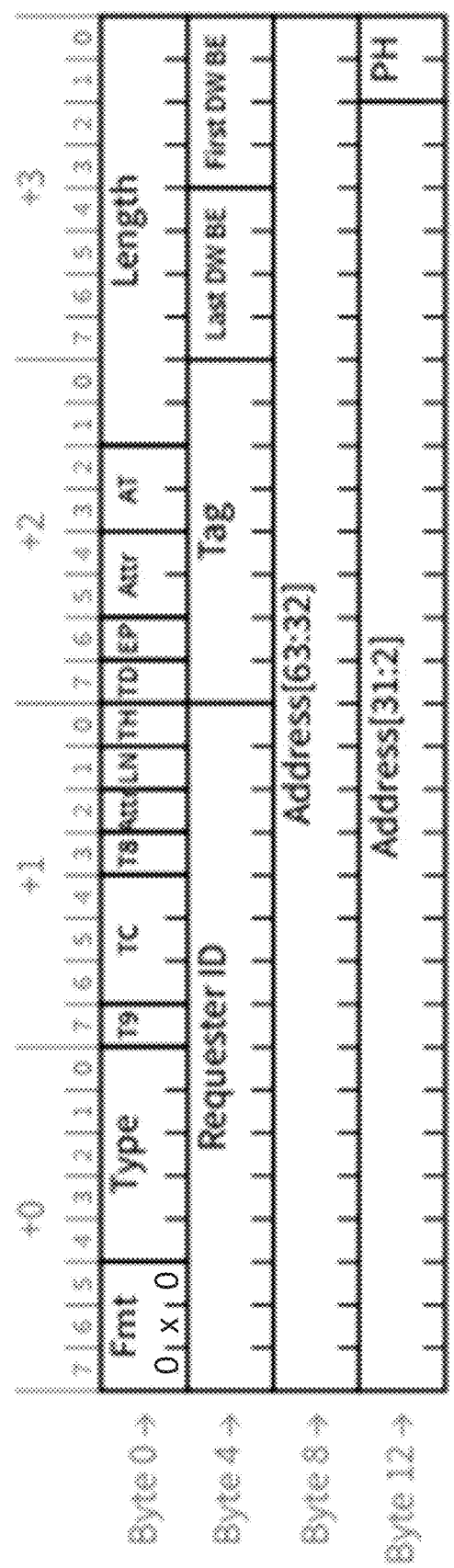
FIGS. 8A-8B illustrate another example of request packet headers for each of two example modes.
Figure 8B:
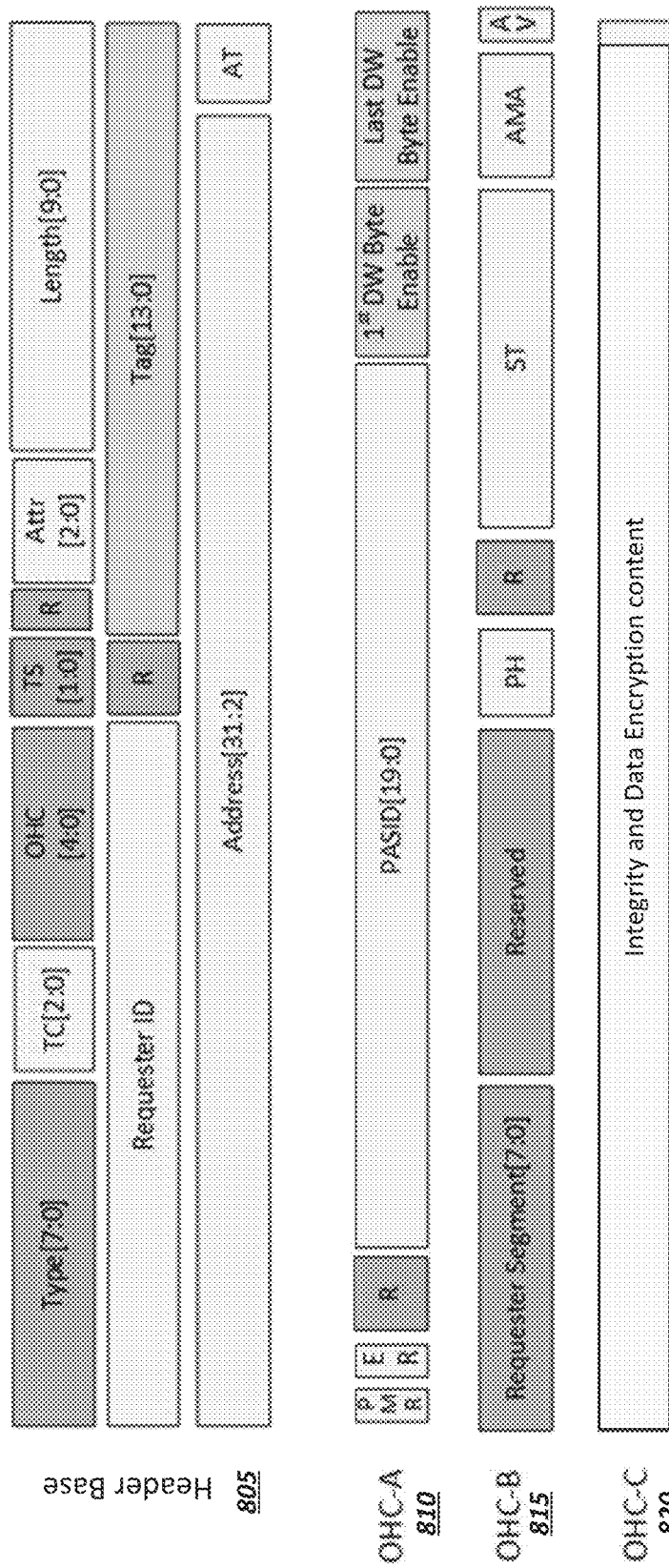
Figure 9A:
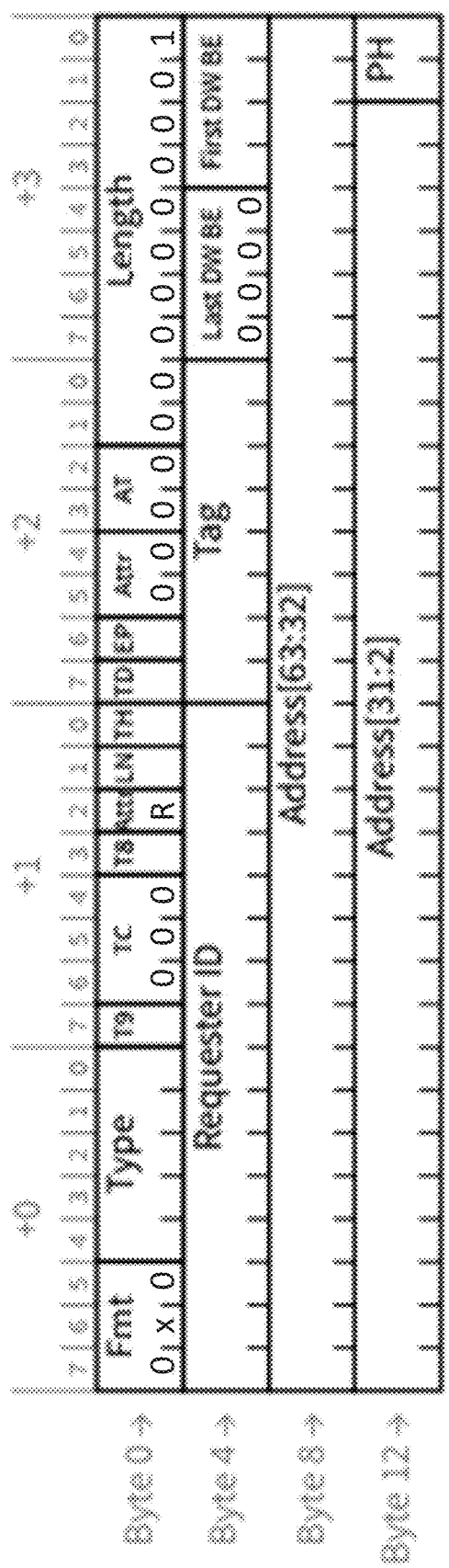
FIGS. 9A-9B illustrate example request packet headers for input/output I/O transactions for each of two example modes.
Figure 9B:
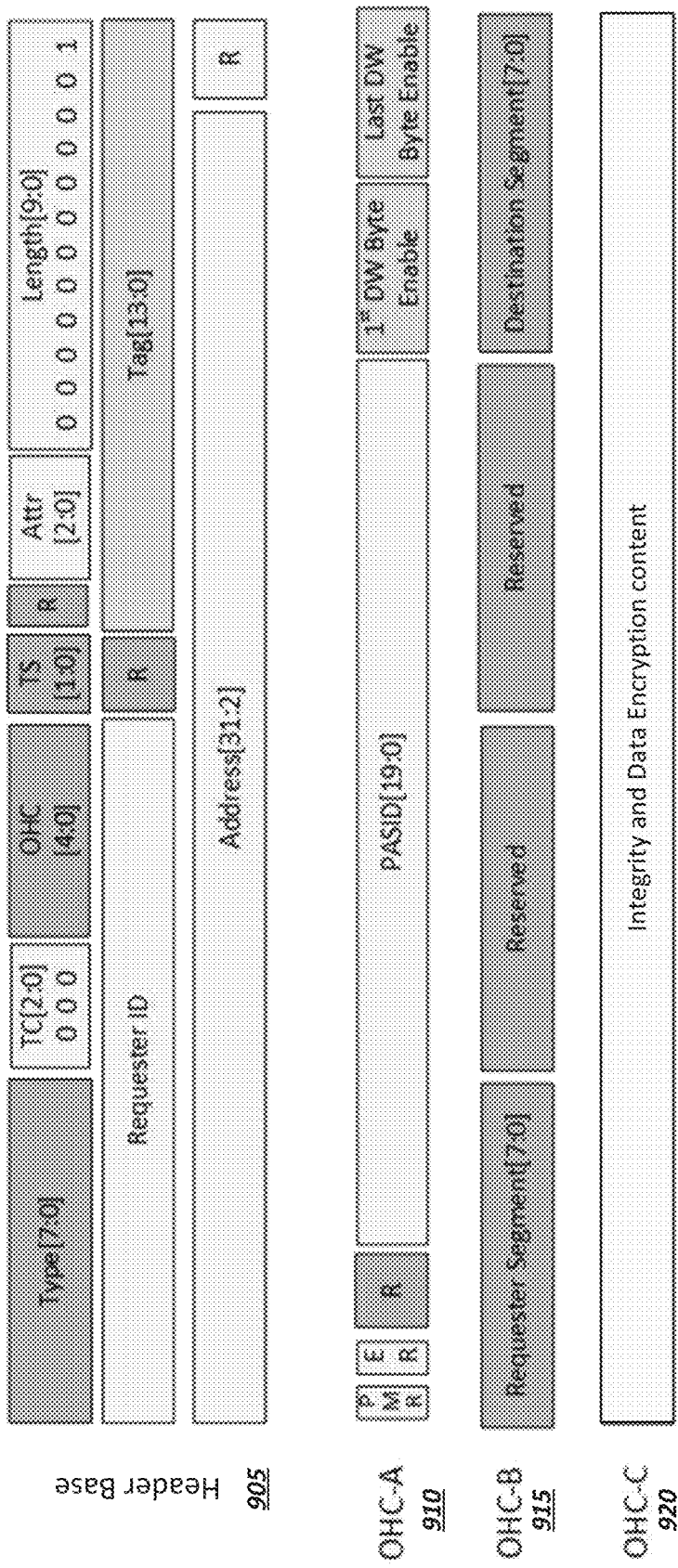

FIG. 8A illustrates a non-flit mode PCIe request header for 32-bit addressing with a format resembling the 64-bit addressing request header in FIG. 7A, but including byte enable fields (e.g., first and last DW byte enable (BE) fields) and a processing hint (PH) field. FIG. 8B illustrates a corresponding flit mode PCIe request header field for 32-bit addressing including the header base 805 and corresponding content header blocks 810, 815, 820, which may be added to the header base. FIG. 9A illustrates a non-flit mode PCIe request header format for I/O transactions. FIG. 9B illustrates a flit mode PCIe request header format for I/O transactions, including a corresponding header base 905 and header content blocks 910, 915, 920.

Figure 10A:
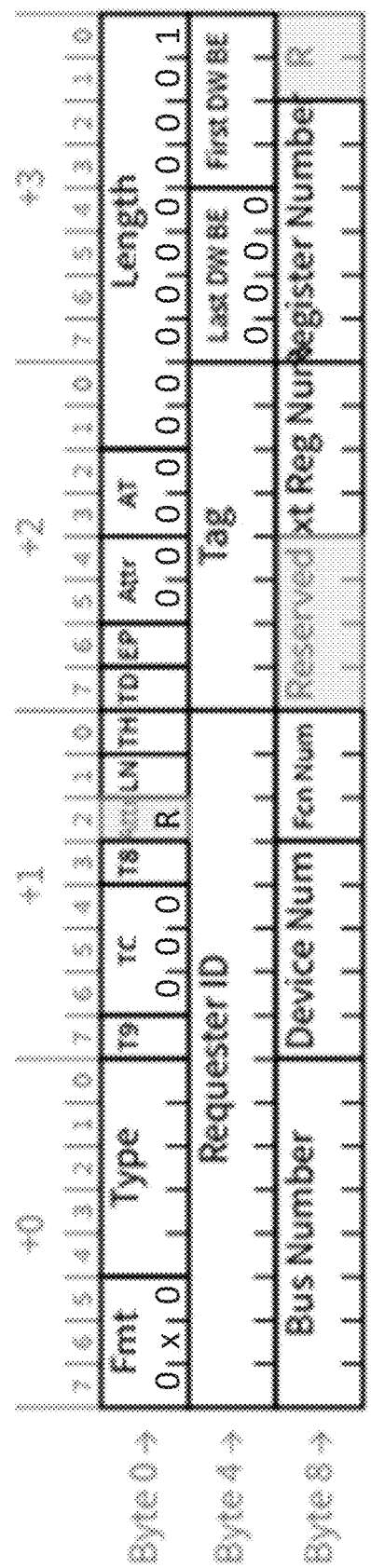
FIGS. 10A-10B illustrate example configuration packet headers for each of two example modes.
Figure 10B:
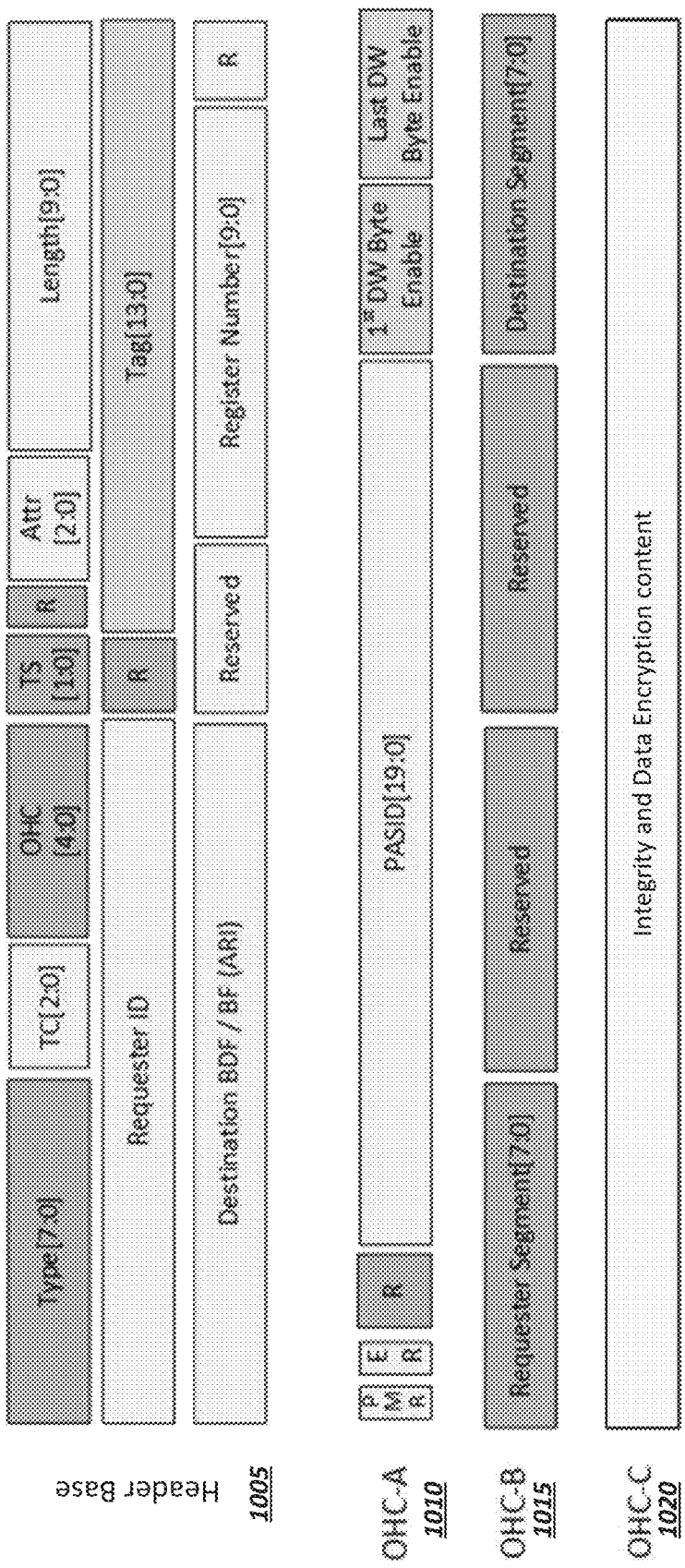

FIG. 10A illustrates a non-flit mode PCIe header format for configuration transactions, including Bus Number, Device Number, and Function Number fields, and Register Number fields (as well as fields discussed above). FIG. 10B illustrates a flit-mode PCIe header format for configuration transactions including a corresponding header base 1005 and header content blocks 1010, 1015, 1020.

Figure 11A:
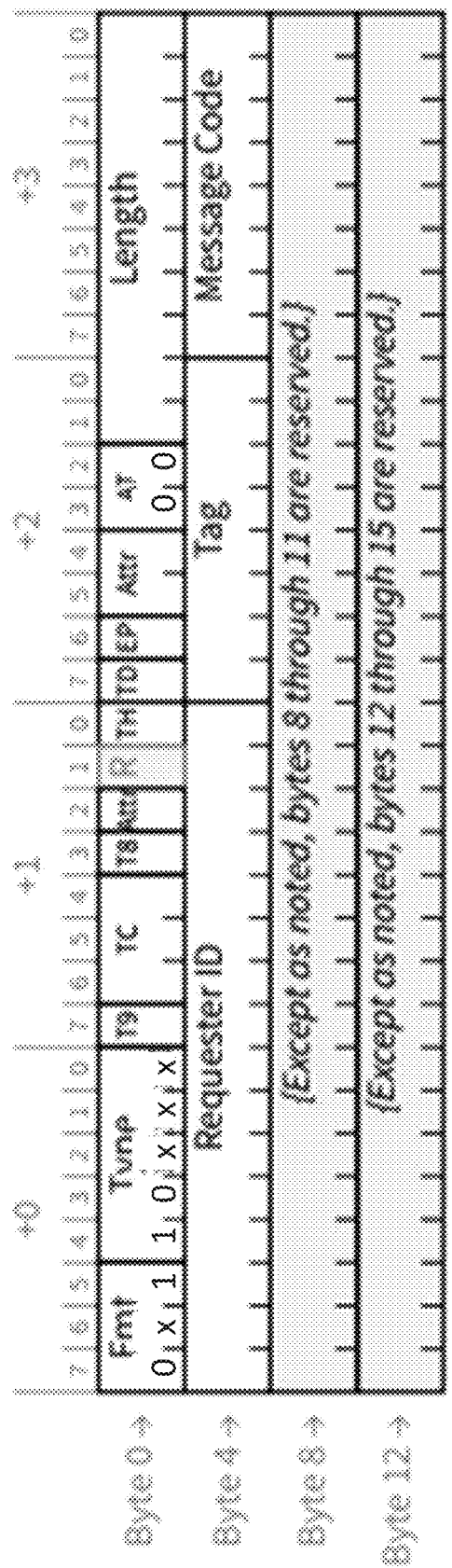
FIGS. 11A-11B illustrate example message request packet headers for each of two example modes.
Figure 11B:
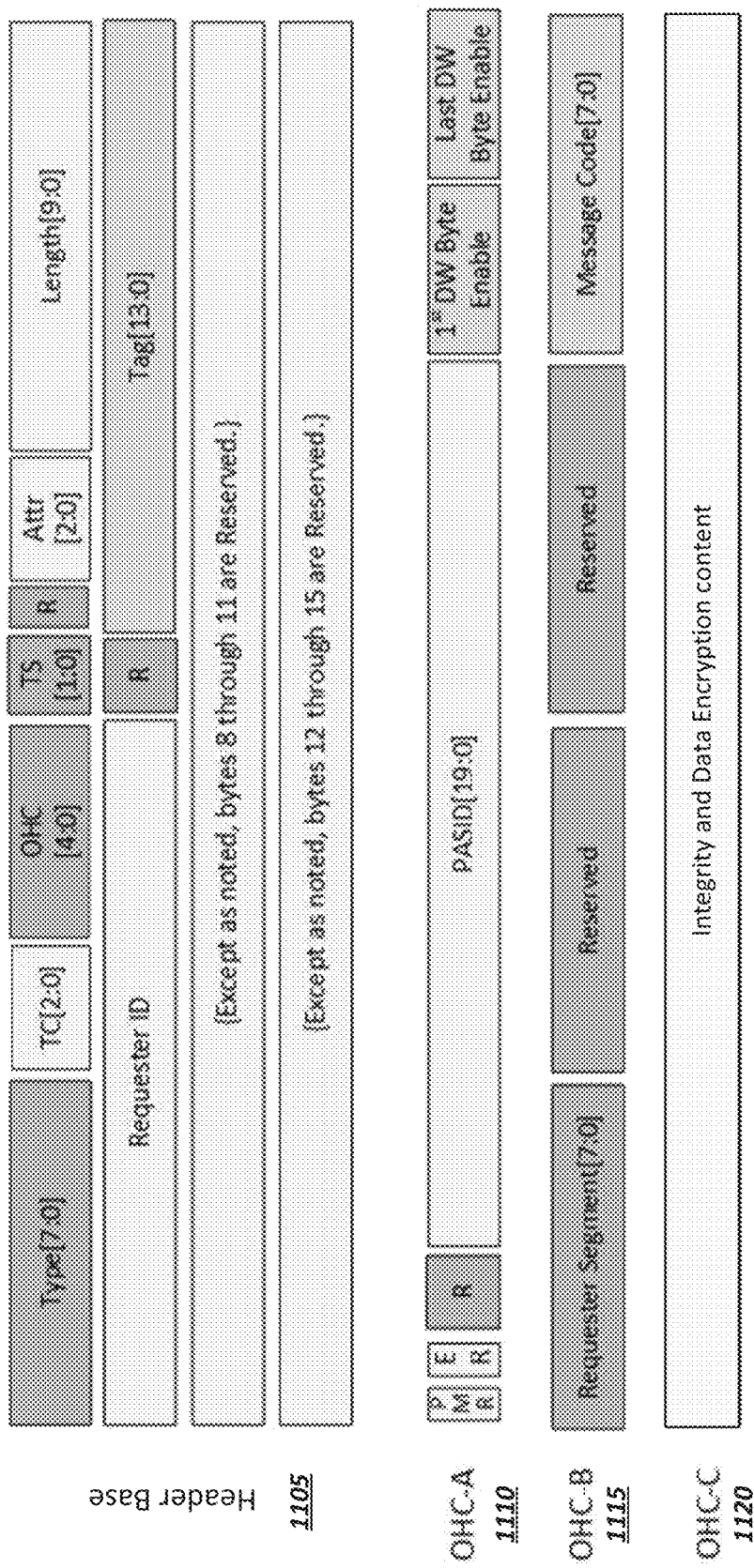

FIG. 11A illustrates a non-flit mode PCIe message request header format including Message Code field. FIG. 11B illustrates a flit mode PCIe message request header format. The flit mode message request header base 1105, unlike the examples in FIGS. 7B, 8B, 9B, and 10B, is defined to be 4DW rather than 3DW. FIG. 11B further shows the header content blocks 1110, 115, 1120 defined for message requests.

Figure 12A:
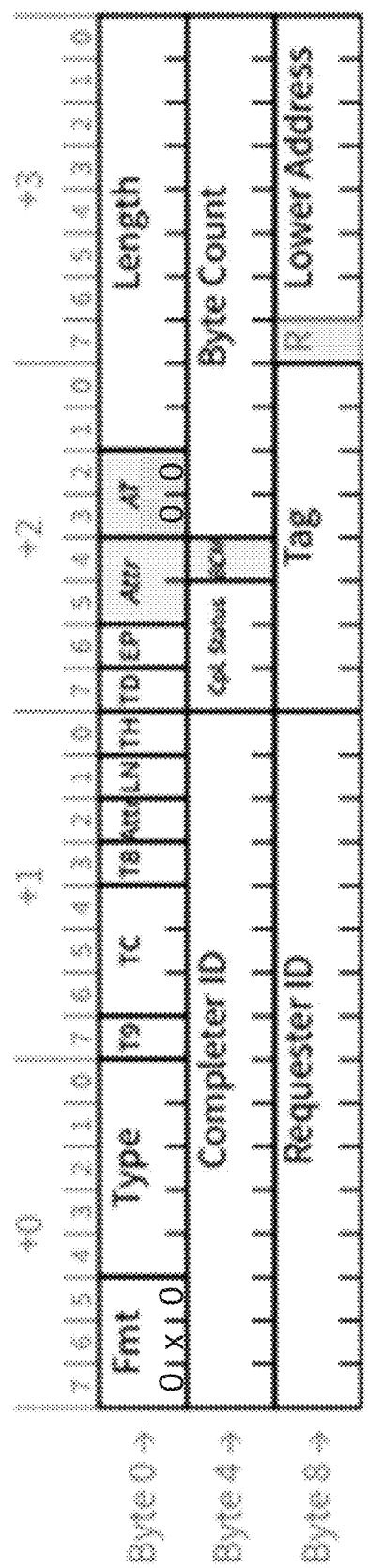
FIGS. 12A-12B illustrate example completion packet headers for each of two example modes.
Figure 12B:
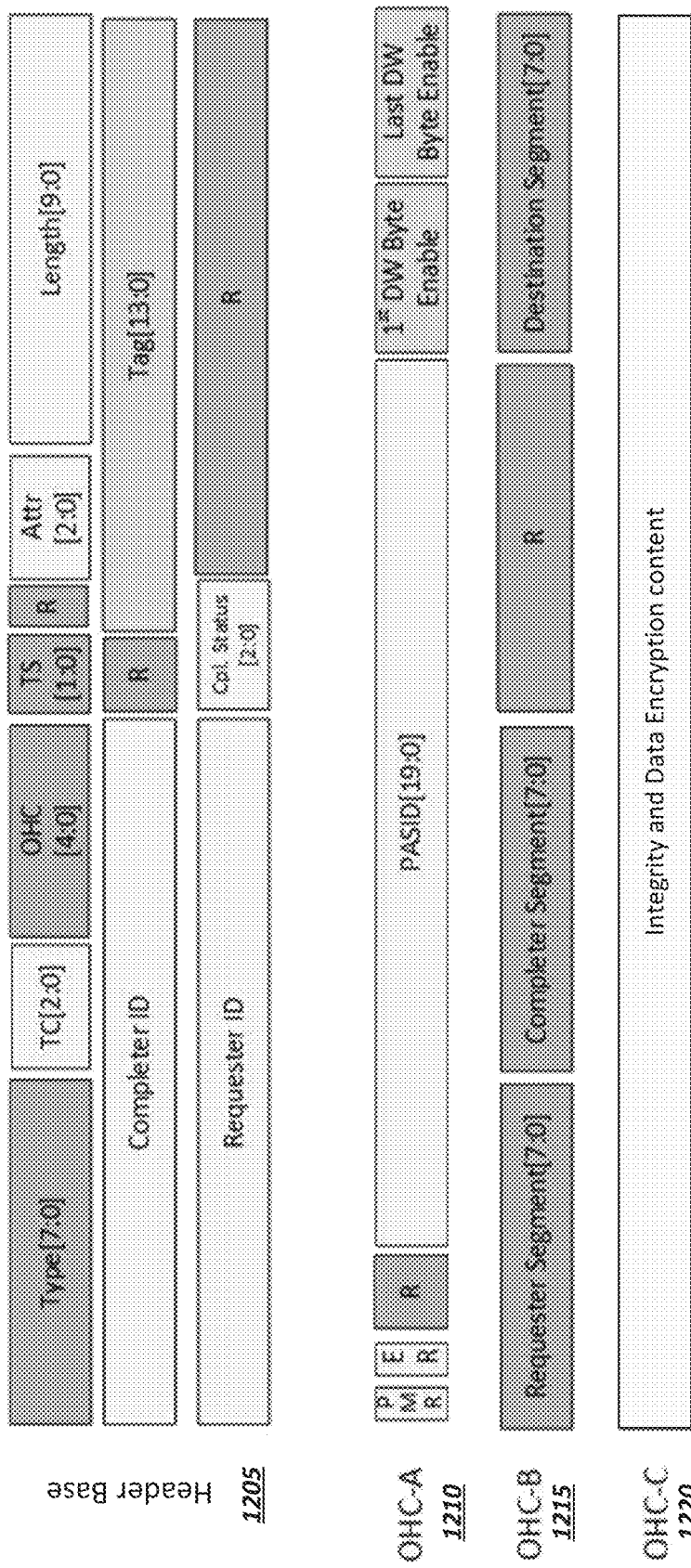

FIG. 12A illustrates a non-flit mode PCIe completion header format including a Completer ID field, Completion Status field, and Lower Address fields, among others previously discussed. FIG. 12B illustrates a flit-mode PCIe completion header format, including corresponding OHC-A 1210, OHC-B 1215, and OHC-C 1220 header content blocks, such as in the other examples above.

While the examples of FIGS. 7B, 8B, 9B, 10B, 11B, 12B illustrates respective type-based implementations of OHC-A, OHC-B, and OHC-C header content blocks, it should be appreciated that other header content blocks may also be defined and made available for inclusion in a flit mode header (and identified in a corresponding OHC field of the header base). For instance, OHC-E header content blocks (e.g., as illustrated in FIG. 6) may also be available to append to the header base (e.g., after the inclusion of any one of the OHC-A, OHC-B, and OHC-C header content blocks). For instance, OHC-E header content blocks may be variable in size and included as either a 1DW, 2DW, or 4DW header content block, among other examples. In some implementations, the OHC-E header content block may be designated for use in conveying vendor defined content along with a TLP, with the nature of the vendor content driving whether the 1DW, 2DW, or 4DW version of the OHC-E is to be used, among other examples.

In some implementations, flit mode may provide for the predefinition of all, or substantially all, encodable values of a Type field (e.g., Type[7:0]) in the flit mode header base. While Format and Type field encodings in non-flit mode PCIe were developed and assigned in an organic manner, in practice, this made hardware adoption of this extensible and changing set of type encodings impractical to implement. Accordingly, in some implementations of a flit mode, Type field encodings may be predefined together with the corresponding routing, flow control (FC) type, header base size, and whether or not a data payload is associated with the type such that hardware or other logic of PCIe devices may be correspondingly configured to understand and handle each of the potential encoded types. For instance, Table 1 illustrates an example definition of the values for the Type[7:0] field in flit mode header bases. In this example, the routing is indicated in the Description field, and the Header Base fields used are at the same location within the header as with the already defined Header Base formats. In some implementations, flit mode routing rules follow the indicated routing type, as for the already defined TLP types. While some types may be "reserved," in name, in one implementation, features of the type (e.g., routing, flow control type, etc.) may nonetheless be defined, such that switch and PCIe port controller circuitry can be forwards compatible and able to do basic processing and routing for as-yet undefined operations.

TABLE A

| # | Type[7:0] | | | | | | | | Description | Name | FC Type | Data Payload? | Header Base Size (DW) | New for FLIT Mode |
| | 7 | 6 | 5 | 4 | 3 | 2 | 1 | 0 | | | | | | |
|---|---|---|---|---|---|---|---|---|---|---|---|---|---|---|
| 0 | 0 | 0 | 0 | 0 | 0 | 0 | 0 | 0 | Memory Read Request, 32b addressing | MRd | NPR | n | 3 | n |
| 1 | 0 | 0 | 0 | 0 | 0 | 0 | 0 | 1 | Memory Read Request Locked, 32b addressing | MRdLk | NPR | n | 3 | n |
| 2 | 0 | 0 | 0 | 0 | 0 | 0 | 1 | 0 | IO Read Request | IORd | NPR | n | 3 | n |
| 3 | 0 | 0 | 0 | 0 | 0 | 0 | 1 | 1 | {reserved entries look like this} | | NPR | n | 3 | y |
| 4 | 0 | 0 | 0 | 0 | 0 | 1 | 0 | 0 | Configuration Read Request, Type 0 | CfgRd0 | NPR | n | 3 | n |
| 5 | 0 | 0 | 0 | 0 | 0 | 1 | 0 | 1 | Configuration Read Request, Type 1 | CfgRd1 | NPR | n | 3 | n |
| 6 | 0 | 0 | 0 | 0 | 0 | 1 | 1 | 0 | Reserved - 32b address routed | | NPR | n | 3 | y |
| 7 | 0 | 0 | 0 | 0 | 0 | 1 | 1 | 1 | Reserved - 32b address routed | | NPR | n | 3 | y |
| 8 | 0 | 0 | 0 | 0 | 1 | 0 | 0 | 0 | Reserved - ID routed | | CPL | n | 3 | y |
| 9 | 0 | 0 | 0 | 0 | 1 | 0 | 0 | 1 | Reserved - ID routed | | CPL | n | 3 | y |
| 10 | 0 | 0 | 0 | 0 | 1 | 0 | 1 | 0 | Completion without Data | Cpl | CPL | n | 3 | n |
| 11 | 0 | 0 | 0 | 0 | 1 | 0 | 1 | 1 | Completion without Data, Locked (only for error cases) | CplLk | CPL | n | 3 | n |
| 12 | 0 | 0 | 0 | 0 | 1 | 1 | 0 | 0 | Reserved - ID routed | | CPL | n | 3 | y |
| 13 | 0 | 0 | 0 | 0 | 1 | 1 | 0 | 1 | Reserved - ID routed | | CPL | n | 3 | y |
| 14 | 0 | 0 | 0 | 0 | 1 | 1 | 1 | 0 | Reserved - ID routed | | CPL | n | 3 | y |
| 15 | 0 | 0 | 0 | 0 | 1 | 1 | 1 | 1 | Reserved - ID routed | | CPL | n | 3 | y |
| 16 | 0 | 0 | 0 | 1 | 0 | 0 | 0 | 0 | Reserved - 32b address routed | | PR | n | 3 | y |
| 17 | 0 | 0 | 0 | 1 | 0 | 0 | 0 | 1 | Reserved - 32b address routed | | PR | n | 3 | y |
| 18 | 0 | 0 | 0 | 1 | 0 | 0 | 1 | 0 | Reserved - 32b address routed | | PR | n | 3 | y |
| 19 | 0 | 0 | 0 | 1 | 0 | 0 | 1 | 1 | Reserved - 32b address routed | | PR | n | 3 | y |
| 20 | 0 | 0 | 0 | 1 | 0 | 1 | 0 | 0 | Reserved - 32b address routed | | PR | n | 3 | y |
| 21 | 0 | 0 | 0 | 1 | 0 | 1 | 0 | 1 | Reserved - 32b address routed | | PR | n | 3 | y |
| 22 | 0 | 0 | 0 | 1 | 0 | 1 | 1 | 0 | Reserved - 32b address routed | | PR | n | 3 | y |
| 23 | 0 | 0 | 0 | 1 | 0 | 1 | 1 | 1 | Reserved - 32b address routed | | PR | n | 3 | y |
| 24 | 0 | 0 | 0 | 1 | 1 | 0 | 0 | 0 | Reserved - 32b address routed | | NPR | n | 3 | y |
| 25 | 0 | 0 | 0 | 1 | 1 | 0 | 0 | 1 | Reserved - 32b address routed | | NPR | n | 3 | y |
| 26 | 0 | 0 | 0 | 1 | 1 | 0 | 1 | 0 | Reserved - 32b address routed | | NPR | n | 3 | y |
| 27 | 0 | 0 | 0 | 1 | 1 | 0 | 1 | 1 | Reserved - 32b address routed [Was: Trusted Configuration Read (deprecated)] | TCfgRd | NPR | n | 3 | n |
| 28 | 0 | 0 | 0 | 1 | 1 | 1 | 0 | 0 | Reserved - ID routed | | NPR | n | 3 | y |
| 29 | 0 | 0 | 0 | 1 | 1 | 1 | 0 | 1 | Reserved - ID routed | | NPR | n | 3 | y |
| 30 | 0 | 0 | 0 | 1 | 1 | 1 | 1 | 0 | Reserved - ID routed | | NPR | n | 3 | y |
| 31 | 0 | 0 | 0 | 1 | 1 | 1 | 1 | 1 | Reserved - ID routed | | NPR | n | 3 | y |

TABLE A-continued

| # | Type[7:0] 7 | 6 | 5 | 4 | 3 | 2 | 1 | 0 | Description | Name | FC Type | Data Payload? | Header Base Size (DW) | New for FLIT Mode |
|---|---|---|---|---|---|---|---|---|---|---|---|---|---|---|
| 32 | 0 | 0 | 1 | 0 | 0 | 0 | 0 | 0 | Memory Read Request, 64b addressing | MRd | NPR | n | 4 | n |
| 33 | 0 | 0 | 1 | 0 | 0 | 0 | 0 | 1 | Memory Read Request Locked, 64b addressing | MRdLk | NPR | n | 4 | n |
| 34 | 0 | 0 | 1 | 0 | 0 | 0 | 1 | 0 | Reserved - 64b address routed | | NPR | n | 4 | y |
| 35 | 0 | 0 | 1 | 0 | 0 | 0 | 1 | 1 | Reserved - 64b address routed | | NPR | n | 4 | y |
| 36 | 0 | 0 | 1 | 0 | 0 | 1 | 0 | 0 | Reserved - 64b address routed | | NPR | n | 4 | y |
| 37 | 0 | 0 | 1 | 0 | 0 | 1 | 0 | 1 | Reserved - 64b address routed | | NPR | n | 4 | y |
| 38 | 0 | 0 | 1 | 0 | 0 | 1 | 1 | 0 | Reserved - 64b address routed | | NPR | n | 4 | y |
| 39 | 0 | 0 | 1 | 0 | 0 | 1 | 1 | 1 | Reserved - 64b address routed | | NPR | n | 4 | y |
| 40 | 0 | 0 | 1 | 0 | 1 | 0 | 0 | 0 | Reserved - ID routed | | CPL | n | 4 | y |
| 41 | 0 | 0 | 1 | 0 | 1 | 0 | 0 | 1 | Reserved - ID routed | | CPL | n | 4 | y |
| 42 | 0 | 0 | 1 | 0 | 1 | 0 | 1 | 0 | Reserved - ID routed | | CPL | n | 4 | y |
| 43 | 0 | 0 | 1 | 0 | 1 | 0 | 1 | 1 | Reserved - ID routed | | CPL | n | 4 | y |
| 44 | 0 | 0 | 1 | 0 | 1 | 1 | 0 | 0 | Reserved - ID routed | | CPL | n | 4 | y |
| 45 | 0 | 0 | 1 | 0 | 1 | 1 | 0 | 1 | Reserved - ID routed | | CPL | n | 4 | y |
| 46 | 0 | 0 | 1 | 0 | 1 | 1 | 1 | 0 | Reserved - ID routed | | CPL | n | 4 | y |
| 47 | 0 | 0 | 1 | 0 | 1 | 1 | 1 | 1 | Reserved - ID routed | | CPL | n | 4 | y |
| 48 | 0 | 0 | 1 | 1 | 0 | 0 | 0 | 0 | Message w/o Data, Routed to Root Complex | Msg | PR | n | 4 | n |
| 49 | 0 | 0 | 1 | 1 | 0 | 0 | 0 | 1 | Message w/o Data, Routed by Address (64b) - NONE DEFINED | Msg | PR | n | 4 | n |
| 50 | 0 | 0 | 1 | 1 | 0 | 0 | 1 | 0 | Message w/o Data, Routed by ID | Msg | PR | n | 4 | n |
| 51 | 0 | 0 | 1 | 1 | 0 | 0 | 1 | 1 | Message w/o Data, Broadcast from Root Complex | Msg | PR | n | 4 | n |
| 52 | 0 | 0 | 1 | 1 | 0 | 1 | 0 | 0 | Message w/o Data, Local - terminate at Receiver | Msg | PR | n | 4 | n |
| 53 | 0 | 0 | 1 | 1 | 0 | 1 | 0 | 1 | Message w/o Data, Gathered and routed to RC (PME_TO_Ack) | Msg | PR | n | 4 | n |
| 54 | 0 | 0 | 1 | 1 | 0 | 1 | 1 | 0 | Message w/o Data -- RESERVED | Msg | PR | n | 4 | n |
| 55 | 0 | 0 | 1 | 1 | 0 | 1 | 1 | 1 | Message w/o Data -- RESERVED | Msg | PR | n | 4 | n |
| 56 | 0 | 0 | 1 | 1 | 1 | 0 | 0 | 0 | Reserved - 64b address routed | | NPR | n | 4 | y |
| 57 | 0 | 0 | 1 | 1 | 1 | 0 | 0 | 1 | Reserved - 64b address routed | | NPR | n | 4 | y |
| 58 | 0 | 0 | 1 | 1 | 1 | 0 | 1 | 0 | Reserved - 64b address routed | | NPR | n | 4 | y |
| 59 | 0 | 0 | 1 | 1 | 1 | 0 | 1 | 1 | Reserved - 64b address routed | | NPR | n | 4 | y |
| 60 | 0 | 0 | 1 | 1 | 1 | 1 | 0 | 0 | Reserved - ID routed | | NPR | n | 4 | y |

TABLE A-continued

| # | Type[7:0] | | | | | | | | Description | Name | FC Type | Data Payload? | Header Base Size (DW) | New for FLIT Mode |
| | 7 | 6 | 5 | 4 | 3 | 2 | 1 | 0 | | | | | | |
|---|---|---|---|---|---|---|---|---|---|---|---|---|---|---|
| 61 | 0 | 0 | 1 | 1 | 1 | 1 | 0 | 1 | Reserved - ID routed | | NPR | n | 4 | y |
| 62 | 0 | 0 | 1 | 1 | 1 | 1 | 1 | 0 | Reserved - ID routed | | NPR | n | 4 | y |
| 63 | 0 | 0 | 1 | 1 | 1 | 1 | 1 | 1 | Reserved - ID routed | | NPR | n | 4 | y |
| 64 | 0 | 1 | 0 | 0 | 0 | 0 | 0 | 0 | Memory Write Request, 32b addressing | MWr | PR | Length | 3 | n |
| 65 | 0 | 1 | 0 | 0 | 0 | 0 | 0 | 1 | Reserved - 32b address routed | | PR | Length | 3 | y |
| 66 | 0 | 1 | 0 | 0 | 0 | 0 | 1 | 0 | IO Write Request | IOWr | NPR | Length | 3 | n |
| 67 | 0 | 1 | 0 | 0 | 0 | 0 | 1 | 1 | Reserved - 32b address routed | | NPR | Length | 3 | y |
| 68 | 0 | 1 | 0 | 0 | 0 | 1 | 0 | 0 | Configuration Write Request, Type 0 | CfgWr0 | NPR | Length | 3 | n |
| 69 | 0 | 1 | 0 | 0 | 0 | 1 | 0 | 1 | Configuration Write Request, Type 1 | CfgWr1 | NPR | Length | 3 | n |
| 70 | 0 | 1 | 0 | 0 | 0 | 1 | 1 | 0 | Reserved - ID routed | | NPR | Length | 3 | y |
| 71 | 0 | 1 | 0 | 0 | 0 | 1 | 1 | 1 | Reserved - ID routed | | NPR | Length | 3 | y |
| 72 | 0 | 1 | 0 | 0 | 1 | 0 | 0 | 0 | Reserved - ID routed | | CPF | Length | 3 | y |
| 73 | 0 | 1 | 0 | 0 | 1 | 0 | 0 | 1 | Reserved - ID routed | | CPF | Length | 3 | y |
| 74 | 0 | 1 | 0 | 0 | 1 | 0 | 1 | 0 | Completion with Data | CplD | CPF | Length | 3 | n |
| 75 | 0 | 1 | 0 | 0 | 1 | 0 | 1 | 1 | Completion with Data, Locked | CplDLk | CPF | Length | 3 | n |
| 76 | 0 | 1 | 0 | 0 | 1 | 1 | 0 | 0 | Fetch and Add AtomicOp Request, 32b addressing | FetchAdd | NPR | Length | 3 | n |
| 77 | 0 | 1 | 0 | 0 | 1 | 1 | 0 | 1 | Unconditional Swap AtomicOp Request, 32b addressing | Swap | NPR | Length | 3 | n |
| 78 | 0 | 1 | 0 | 0 | 1 | 1 | 1 | 0 | Compare and Swap AtomicOp Request, 32b addressing | CAS | NPR | Length | 3 | n |
| 79 | 0 | 1 | 0 | 0 | 1 | 1 | 1 | 1 | Reserved - 32b address routed | | NPR | Length | 3 | y |
| 80 | 0 | 1 | 0 | 1 | 0 | 0 | 0 | 0 | Reserved - 32b address routed | | PR | Length | 3 | y |
| 81 | 0 | 1 | 0 | 1 | 0 | 0 | 0 | 1 | Reserved - 32b address routed | | PR | Length | 3 | y |
| 82 | 0 | 1 | 0 | 1 | 0 | 0 | 1 | 0 | Reserved - 32b address routed | | PR | Length | 3 | y |
| 83 | 0 | 1 | 0 | 1 | 0 | 0 | 1 | 1 | Reserved - 32b address routed | | PR | Length | 3 | y |
| 84 | 0 | 1 | 0 | 1 | 0 | 1 | 0 | 0 | Reserved - 32b address routed | | PR | Length | 3 | y |
| 85 | 0 | 1 | 0 | 1 | 0 | 1 | 0 | 1 | Reserved - 32b address routed | | PR | Length | 3 | y |
| 86 | 0 | 1 | 0 | 1 | 0 | 1 | 1 | 0 | Reserved - 32b address routed | | PR | Length | 3 | y |
| 87 | 0 | 1 | 0 | 1 | 0 | 1 | 1 | 1 | Reserved - 32b address routed | | PR | Length | 3 | y |
| 88 | 0 | 1 | 0 | 1 | 1 | 0 | 0 | 0 | Reserved - 32b address routed | | NPR | Length | 3 | y |
| 89 | 0 | 1 | 0 | 1 | 1 | 0 | 0 | 1 | Reserved - 32b address routed | | NPR | Length | 3 | y |
| 90 | 0 | 1 | 0 | 1 | 1 | 0 | 1 | 0 | Reserved - 32b address routed | | NPR | Length | 3 | y |

TABLE A-continued

| # | Type[7:0] | | | | | | | | Description | Name | FC Type | Data Payload? | Header Base Size (DW) | New for FLIT Mode |
| --- | --- | --- | --- | --- | --- | --- | --- | --- | --- | --- | --- | --- | --- | --- |
| | 7 | 6 | 5 | 4 | 3 | 2 | 1 | 0 | | | | | | |
| 91 | 0 | 1 | 0 | 1 | 1 | 0 | 1 | 1 | Deferrable Memory Write Request, 32b addressing was: Trusted Configuration Write (deprecated)} | DMWr | NPR | Length | 3 | n |
| 92 | 0 | 1 | 0 | 1 | 1 | 1 | 0 | 0 | Reserved - 32b address routed | | NPR | Length | 3 | y |
| 93 | 0 | 1 | 0 | 1 | 1 | 1 | 0 | 1 | Reserved - 32b address routed | | NPR | Length | 3 | y |
| 94 | 0 | 1 | 0 | 1 | 1 | 1 | 1 | 0 | Reserved - 32b address routed | | NPR | Length | 3 | y |
| 95 | 0 | 1 | 0 | 1 | 1 | 1 | 1 | 1 | Reserved - 32b address routed | | NPR | Length | 3 | y |
| 96 | 0 | 1 | 1 | 0 | 0 | 0 | 0 | 0 | Memory Write Request, 64b addressing | MWr | PR | Length | 4 | n |
| 97 | 0 | 1 | 1 | 0 | 0 | 0 | 0 | 1 | Reserved - 64b address routed | | PR | Length | 4 | y |
| 98 | 0 | 1 | 1 | 0 | 0 | 0 | 1 | 0 | Reserved - 64b address routed | | PR | Length | 4 | y |
| 99 | 0 | 1 | 1 | 0 | 0 | 0 | 1 | 1 | Reserved - 64b address routed | | PR | Length | 4 | y |
| 100 | 0 | 1 | 1 | 0 | 0 | 1 | 0 | 0 | Reserved - 64b address routed | | PR | Length | 4 | y |
| 101 | 0 | 1 | 1 | 0 | 0 | 1 | 0 | 1 | Reserved - 64b address routed | | PR | Length | 4 | y |
| 102 | 0 | 1 | 1 | 0 | 0 | 1 | 1 | 0 | Reserved - 64b address routed | | PR | Length | 4 | y |
| 103 | 0 | 1 | 1 | 0 | 0 | 1 | 1 | 1 | Reserved - 64b address routed | | PR | Length | 4 | y |
| 104 | 0 | 1 | 1 | 0 | 1 | 0 | 0 | 0 | Reserved - 64b address routed | | PR | Length | 4 | y |
| 105 | 0 | 1 | 1 | 0 | 1 | 0 | 0 | 1 | Reserved - 64b address routed | | PR | Length | 4 | y |
| 106 | 0 | 1 | 1 | 0 | 1 | 0 | 1 | 0 | Reserved - 64b address routed | | PR | Length | 4 | y |
| 107 | 0 | 1 | 1 | 0 | 1 | 0 | 1 | 1 | Reserved - 64b address routed | | PR | Length | 4 | y |
| 108 | 0 | 1 | 1 | 0 | 1 | 1 | 0 | 0 | Fetch and Add AtomicOp Request, 64b addressing | FetchAdd | NPR | Length | 4 | n |
| 109 | 0 | 1 | 1 | 0 | 1 | 1 | 0 | 1 | Unconditional Swap AtomicOp Request, 64b addressing | Swap | NPR | Length | 4 | n |
| 110 | 0 | 1 | 1 | 0 | 1 | 1 | 1 | 0 | Compare and Swap AtomicOp Request, 64b addressing | CAS | NPR | Length | 4 | n |
| 111 | 0 | 1 | 1 | 0 | 1 | 1 | 1 | 1 | Reserved - 64b address routed | | NPR | Length | 4 | y |
| 112 | 0 | 1 | 1 | 1 | 0 | 0 | 0 | 0 | Message with Data, Routed to Root Complex | MsgD | PR | Length | 4 | n |
| 113 | 0 | 1 | 1 | 1 | 0 | 0 | 0 | 1 | Message with Data, Routed by Address (64b) - NONE DEFINED | MsgD | PR | Length | 4 | n |
| 114 | 0 | 1 | 1 | 1 | 0 | 0 | 1 | 0 | Message with Data, Routed by ID | MsgD | PR | Length | 4 | n |
| 115 | 0 | 1 | 1 | 1 | 0 | 0 | 1 | 1 | Message with Data, Broadcast from Root Complex | MsgD | PR | Length | 4 | n |

TABLE A-continued

| | Type[7:0] | | | | | | | | | | | Header Base Size | New for FLIT |
|---|---|---|---|---|---|---|---|---|---|---|---|---|---|
| # | 7 | 6 | 5 | 4 | 3 | 2 | 1 | 0 | Description | Name | FC Type | Data Payload? | (DW) | Mode |
| 116 | 0 | 1 | 1 | 1 | 0 | 1 | 0 | 0 | Message with Data, Local - terminate at Receiver | MsgD | PR | Length | 4 | n |
| 117 | 0 | 1 | 1 | 1 | 0 | 1 | 0 | 1 | Message with Data, Gathered and routed to RC (MsgD NOT USED) | MsgD | PR | Length | 4 | n |
| 118 | 0 | 1 | 1 | 1 | 0 | 1 | 1 | 0 | Message with Data -- RESERVED | MsgD | PR | Length | 4 | n |
| 119 | 0 | 1 | 1 | 1 | 0 | 1 | 1 | 1 | Message with Data -- RESERVED | MsgD | PR | Length | 4 | n |
| 120 | 0 | 1 | 1 | 1 | 1 | 0 | 0 | 0 | Reserved - 64b address routed | | NPR | Length | 4 | y |
| 121 | 0 | 1 | 1 | 1 | 1 | 0 | 0 | 1 | Reserved - 64b address routed | | NPR | Length | 4 | y |
| 122 | 0 | 1 | 1 | 1 | 1 | 0 | 1 | 0 | Reserved - 64b address routed | | NPR | Length | 4 | y |
| 123 | 0 | 1 | 1 | 1 | 1 | 0 | 1 | 1 | Deferrable Memory Write Request, 64b addressing | DMWr | NPR | Length | 4 | n |
| 124 | 0 | 1 | 1 | 1 | 1 | 1 | 0 | 0 | Reserved - 64b address routed | | NPR | Length | 4 | y |
| 125 | 0 | 1 | 1 | 1 | 1 | 1 | 0 | 1 | Reserved - 64b address routed | | NPR | Length | 4 | y |
| 126 | 0 | 1 | 1 | 1 | 1 | 1 | 1 | 0 | Reserved - 64b address routed | | NPR | Length | 4 | y |
| 127 | 0 | 1 | 1 | 1 | 1 | 1 | 1 | 1 | Reserved - 64b address routed | | NPR | Length | 4 | y |
| 128 | 1 | 0 | 0 | 0 | 0 | 0 | 0 | 0 | Reserved - Local | | none | n | 1 | n |
| 129 | 1 | 0 | 0 | 0 | 0 | 0 | 0 | 1 | Reserved - Local | | none | n | 1 | n |
| 130 | 1 | 0 | 0 | 0 | 0 | 0 | 1 | 0 | Reserved - Local | | none | n | 1 | n |
| 131 | 1 | 0 | 0 | 0 | 0 | 0 | 1 | 1 | Reserved - Local | | none | n | 1 | n |
| 132 | 1 | 0 | 0 | 0 | 0 | 1 | 0 | 0 | Reserved - Local | | none | n | 1 | n |
| 133 | 1 | 0 | 0 | 0 | 0 | 1 | 0 | 1 | Reserved - Local | | none | n | 1 | n |
| 134 | 1 | 0 | 0 | 0 | 0 | 1 | 1 | 0 | Reserved - Local | | none | n | 1 | n |
| 135 | 1 | 0 | 0 | 0 | 0 | 1 | 1 | 1 | Reserved - Local | | none | n | 1 | n |
| 136 | 1 | 0 | 0 | 0 | 1 | 0 | 0 | 0 | NOP - 1DW | | none | n | 1 | n |
| 137 | 1 | 0 | 0 | 0 | 1 | 0 | 0 | 1 | Reserved - Local | | none | n | 1 | n |
| 138 | 1 | 0 | 0 | 0 | 1 | 0 | 1 | 0 | Reserved - Local | | none | n | 1 | n |
| 139 | 1 | 0 | 0 | 0 | 1 | 0 | 1 | 1 | Reserved - Local | | none | n | 1 | n |
| 140 | 1 | 0 | 0 | 0 | 1 | 1 | 0 | 0 | Reserved - Local | | none | n | 1 | n |
| 141 | 1 | 0 | 0 | 0 | 1 | 1 | 0 | 1 | Reserved - Local | | none | n | 1 | n |
| 142 | 1 | 0 | 0 | 0 | 1 | 1 | 1 | 0 | 1 DW Prefix- Vendor Defined Local 0 | | none | n | 1 | n |
| 143 | 1 | 0 | 0 | 0 | 1 | 1 | 1 | 1 | 1 DW Prefix - Vendor Defined Local 1 | | none | n | 1 | n |
| 144 | 1 | 0 | 0 | 1 | 0 | 0 | 0 | 0 | EDB Suffix | | none | n | 1 | y |
| 145 | 1 | 0 | 0 | 1 | 0 | 0 | 0 | 1 | Poisoned TLP Suffix | | none | n | 1 | y |
| 146 | 1 | 0 | 0 | 1 | 0 | 0 | 1 | 0 | Reserved - Suffix | | none | n | 1 | y |
| 147 | 1 | 0 | 0 | 1 | 0 | 0 | 1 | 1 | Reserved - Suffix | | none | n | 1 | y |

TABLE A-continued

| | Type[7:0] | | | | | | | | | | | Header Base Size | New for FLIT |
|---|---|---|---|---|---|---|---|---|---|---|---|---|---|
| # | 7 | 6 | 5 | 4 | 3 | 2 | 1 | 0 | Description | Name | FC Type | Data Payload? | (DW) | Mode |
| 148 | 1 | 0 | 0 | 1 | 0 | 1 | 0 | 0 | Reserved - Suffix | | none | n | 1 | y |
| 149 | 1 | 0 | 0 | 1 | 0 | 1 | 0 | 1 | Reserved - Suffix | | none | n | 1 | y |
| 150 | 1 | 0 | 0 | 1 | 0 | 1 | 1 | 0 | Reserved - Suffix | | none | n | 1 | y |
| 151 | 1 | 0 | 0 | 1 | 0 | 1 | 1 | 1 | Reserved - Suffix | | none | n | 1 | y |
| 152 | 1 | 0 | 0 | 1 | 1 | 0 | 0 | 0 | Reserved - Suffix | | none | n | 1 | y |
| 153 | 1 | 0 | 0 | 1 | 1 | 0 | 0 | 1 | Reserved - Suffix | | none | n | 1 | y |
| 154 | 1 | 0 | 0 | 1 | 1 | 0 | 1 | 0 | Reserved - Suffix | | none | n | 1 | y |
| 155 | 1 | 0 | 0 | 1 | 1 | 0 | 1 | 1 | Reserved - Suffix | | none | n | 1 | y |
| 156 | 1 | 0 | 0 | 1 | 1 | 1 | 0 | 0 | Reserved - Suffix | | none | n | 1 | y |
| 157 | 1 | 0 | 0 | 1 | 1 | 1 | 0 | 1 | Reserved - Suffix | | none | n | 1 | y |
| 158 | 1 | 0 | 0 | 1 | 1 | 1 | 1 | 0 | Reserved - Suffix | | none | n | 1 | y |
| 159 | 1 | 0 | 0 | 1 | 1 | 1 | 1 | 1 | Reserved - Suffix | | none | n | 1 | y |
| 160 | 1 | 0 | 1 | 0 | 0 | 0 | 0 | 0 | Reserved - 64b address routed | | NPR | n | 5 | y |
| 161 | 1 | 0 | 1 | 0 | 0 | 0 | 0 | 1 | Reserved - 64b address routed | | NPR | n | 5 | y |
| 162 | 1 | 0 | 1 | 0 | 0 | 0 | 1 | 0 | Reserved - 64b address routed | | NPR | n | 5 | y |
| 163 | 1 | 0 | 1 | 0 | 0 | 0 | 1 | 1 | Reserved - 64b address routed | | NPR | n | 5 | y |
| 164 | 1 | 0 | 1 | 0 | 0 | 1 | 0 | 0 | Reserved - 64b address routed | | NPR | n | 5 | y |
| 165 | 1 | 0 | 1 | 0 | 0 | 1 | 0 | 1 | Reserved - 64b address routed | | NPR | n | 5 | y |
| 166 | 1 | 0 | 1 | 0 | 0 | 1 | 1 | 0 | Reserved - 64b address routed | | NPR | n | 5 | y |
| 167 | 1 | 0 | 1 | 0 | 0 | 1 | 1 | 1 | Reserved - 64b address routed | | NPR | n | 5 | y |
| 168 | 1 | 0 | 1 | 0 | 1 | 0 | 0 | 0 | Reserved - ID routed | | CPL | n | 4 | y |
| 169 | 1 | 0 | 1 | 0 | 1 | 0 | 0 | 1 | Reserved - ID routed | | CPL | n | 4 | y |
| 170 | 1 | 0 | 1 | 0 | 1 | 0 | 1 | 0 | Reserved - ID routed | | CPL | n | 4 | y |
| 171 | 1 | 0 | 1 | 0 | 1 | 0 | 1 | 1 | Reserved - ID routed | | CPL | n | 4 | y |
| 172 | 1 | 0 | 1 | 0 | 1 | 1 | 0 | 0 | Reserved - ID routed | | CPL | Length | 4 | y |
| 173 | 1 | 0 | 1 | 0 | 1 | 1 | 0 | 1 | Reserved - ID routed | | CPL | Length | 4 | y |
| 174 | 1 | 0 | 1 | 0 | 1 | 1 | 1 | 0 | Reserved - ID routed | | CPL | Length | 4 | y |
| 175 | 1 | 0 | 1 | 0 | 1 | 1 | 1 | 1 | Reserved - ID routed | | CPL | Length | 4 | y |
| 176 | 1 | 0 | 1 | 1 | 0 | 0 | 0 | 0 | Reserved - 64b address routed | | PR | Length | 5 | y |
| 177 | 1 | 0 | 1 | 1 | 0 | 0 | 0 | 1 | Reserved - 64b address routed | | PR | Length | 5 | y |
| 178 | 1 | 0 | 1 | 1 | 0 | 0 | 1 | 0 | Reserved - 64b address routed | | PR | Length | 5 | y |
| 179 | 1 | 0 | 1 | 1 | 0 | 0 | 0 | 1 | Reserved - 64b address routed | | PR | Length | 5 | y |
| 180 | 1 | 0 | 1 | 1 | 0 | 1 | 0 | 0 | Reserved - 64b address routed | | PR | Length | 5 | y |
| 181 | 1 | 0 | 1 | 1 | 0 | 1 | 0 | 1 | Reserved - 64b address routed | | PR | Length | 5 | y |
| 182 | 1 | 0 | 1 | 1 | 0 | 1 | 1 | 0 | Reserved - 64b address routed | | PR | Length | 5 | y |
| 183 | 1 | 0 | 1 | 1 | 0 | 1 | 1 | 1 | Reserved - 64b address routed | | PR | Length | 5 | y |
| 184 | 1 | 0 | 1 | 1 | 1 | 0 | 0 | 0 | Reserved - 64b address routed | | PR | Length | 5 | y |

TABLE A-continued

| | Type[7:0] | | | | | | | | | | | | Header Base Size | New for FLIT |
| # | 7 | 6 | 5 | 4 | 3 | 2 | 1 | 0 | Description | Name | FC Type | Data Payload? | (DW) | Mode |
|---|---|---|---|---|---|---|---|---|---|---|---|---|---|---|
| 185 | 1 | 0 | 1 | 1 | 1 | 0 | 0 | 1 | Reserved - 64b address routed | | PR | Length | 5 | y |
| 186 | 1 | 0 | 1 | 1 | 1 | 0 | 1 | 0 | Reserved - 64b address routed | | PR | Length | 5 | y |
| 187 | 1 | 0 | 1 | 1 | 1 | 0 | 1 | 1 | Reserved - 64b address routed | | PR | Length | 5 | y |
| 188 | 1 | 0 | 1 | 1 | 1 | 1 | 0 | 0 | Reserved - 64b address routed | | PR | Length | 5 | y |
| 189 | 1 | 0 | 1 | 1 | 1 | 1 | 0 | 1 | Reserved - 64b address routed | | PR | Length | 5 | y |
| 190 | 1 | 0 | 1 | 1 | 1 | 1 | 1 | 0 | Reserved - 64b address routed | | PR | Length | 5 | y |
| 191 | 1 | 0 | 1 | 1 | 1 | 1 | 1 | 1 | Reserved - 64b address routed | | PR | Length | 5 | y |
| 192 | 1 | 1 | 0 | 0 | 0 | 0 | 0 | 0 | Reserved - 64b address routed | | NPR | n | 6 | y |
| 193 | 1 | 1 | 0 | 0 | 0 | 0 | 0 | 1 | Reserved - 64b address routed | | NPR | n | 6 | y |
| 194 | 1 | 1 | 0 | 0 | 0 | 0 | 1 | 0 | Reserved - 64b address routed | | NPR | n | 6 | y |
| 195 | 1 | 1 | 0 | 0 | 0 | 0 | 1 | 1 | Reserved - 64b address routed | | NPR | n | 6 | y |
| 196 | 1 | 1 | 0 | 0 | 0 | 1 | 0 | 0 | Reserved - 64b address routed | | NPR | n | 6 | y |
| 197 | 1 | 1 | 0 | 0 | 0 | 1 | 0 | 1 | Reserved - 64b address routed | | NPR | n | 6 | y |
| 198 | 1 | 1 | 0 | 0 | 0 | 1 | 1 | 0 | Reserved - 64b address routed | | NPR | n | 6 | y |
| 199 | 1 | 1 | 0 | 0 | 0 | 1 | 1 | 1 | Reserved - 64b address routed | | NPR | n | 6 | y |
| 200 | 1 | 1 | 0 | 0 | 1 | 0 | 0 | 0 | Reserved - ID routed | | CPL | n | 5 | y |
| 201 | 1 | 1 | 0 | 0 | 1 | 0 | 0 | 1 | Reserved - ID routed | | CPL | n | 5 | y |
| 202 | 1 | 1 | 0 | 0 | 1 | 0 | 1 | 0 | Reserved - ID routed | | CPL | n | 5 | y |
| 203 | 1 | 1 | 0 | 0 | 1 | 0 | 1 | 1 | Reserved - ID routed | | CPL | n | 5 | y |
| 204 | 1 | 1 | 0 | 0 | 1 | 1 | 0 | 0 | Reserved - ID routed | | CPL | Length | 5 | y |
| 205 | 1 | 1 | 0 | 0 | 1 | 1 | 0 | 1 | Reserved - ID routed | | CPL | Length | 5 | y |
| 206 | 1 | 1 | 0 | 0 | 1 | 1 | 1 | 0 | Reserved - ID routed | | CPL | Length | 5 | y |
| 207 | 1 | 1 | 0 | 0 | 1 | 1 | 1 | 1 | Reserved - ID routed | | CPL | Length | 5 | y |
| 208 | 1 | 1 | 0 | 1 | 0 | 0 | 0 | 0 | Reserved - 64b address routed | | PR | Length | 6 | y |
| 209 | 1 | 1 | 0 | 1 | 0 | 0 | 0 | 1 | Reserved - 64b address routed | | PR | Length | 6 | y |
| 210 | 1 | 1 | 0 | 1 | 0 | 0 | 1 | 0 | Reserved - 64b address routed | | PR | Length | 6 | y |
| 211 | 1 | 1 | 0 | 1 | 0 | 0 | 1 | 1 | Reserved - 64b address routed | | PR | Length | 6 | y |
| 212 | 1 | 1 | 0 | 1 | 0 | 1 | 0 | 0 | Reserved - 64b address routed | | PR | Length | 6 | y |
| 213 | 1 | 1 | 0 | 1 | 0 | 1 | 0 | 1 | Reserved - 64b address routed | | PR | Length | 6 | y |
| 214 | 1 | 1 | 0 | 1 | 0 | 1 | 1 | 0 | Reserved - 64b address routed | | PR | Length | 6 | y |
| 215 | 1 | 1 | 0 | 1 | 0 | 1 | 1 | 1 | Reserved - 64b address routed | | PR | Length | 6 | y |
| 216 | 1 | 1 | 0 | 1 | 1 | 0 | 0 | 0 | Reserved - 64b address routed | | PR | Length | 6 | y |
| 217 | 1 | 1 | 0 | 1 | 1 | 0 | 0 | 1 | Reserved - 64b address routed | | PR | Length | 6 | y |
| 218 | 1 | 1 | 0 | 1 | 1 | 0 | 1 | 0 | Reserved - 64b address routed | | PR | Length | 6 | y |
| 219 | 1 | 1 | 0 | 1 | 1 | 0 | 1 | 1 | Reserved - 64b address routed | | PR | Length | 6 | y |
| 220 | 1 | 1 | 0 | 1 | 1 | 1 | 0 | 0 | Reserved - 64b address routed | | PR | Length | 6 | y |
| 221 | 1 | 1 | 0 | 1 | 1 | 1 | 0 | 1 | Reserved - 64b address routed | | PR | Length | 6 | y |

TABLE A-continued

| # | Type[7:0] | | | | | | | | Description | Name | FC Type | Data Payload? | Header Base Size (DW) | New for FLIT Mode |
|---|---|---|---|---|---|---|---|---|---|---|---|---|---|---|
|   | 7 | 6 | 5 | 4 | 3 | 2 | 1 | 0 |  |  |  |  |  |  |
| 222 | 1 | 1 | 0 | 1 | 1 | 1 | 1 | 0 | Reserved - 64b address routed |  | PR | Length | 6 | y |
| 223 | 1 | 1 | 0 | 1 | 1 | 1 | 1 | 1 | Reserved - 64b address routed |  | PR | Length | 6 | y |
| 224 | 1 | 1 | 1 | 0 | 0 | 0 | 0 | 0 | Reserved - Local |  | none | n | 4 | y |
| 225 | 1 | 1 | 1 | 0 | 0 | 0 | 0 | 1 | Reserved - Local |  | none | n | 4 | y |
| 226 | 1 | 1 | 1 | 0 | 0 | 0 | 1 | 0 | Reserved - Local |  | none | n | 4 | y |
| 227 | 1 | 1 | 1 | 0 | 0 | 0 | 1 | 1 | Reserved - Local |  | none | n | 4 | y |
| 228 | 1 | 1 | 1 | 0 | 0 | 1 | 0 | 0 | Reserved - Local |  | none | n | 4 | y |
| 229 | 1 | 1 | 1 | 0 | 0 | 1 | 0 | 1 | Reserved - Local |  | none | n | 4 | y |
| 230 | 1 | 1 | 1 | 0 | 0 | 1 | 1 | 0 | Reserved - Local |  | none | n | 4 | y |
| 231 | 1 | 1 | 1 | 0 | 0 | 1 | 1 | 1 | Reserved - Local |  | none | n | 4 | y |
| 232 | 1 | 1 | 1 | 0 | 1 | 0 | 0 | 0 | Reserved - 64b address routed |  | NPR | n | 7 | y |
| 233 | 1 | 1 | 1 | 0 | 1 | 0 | 0 | 1 | Reserved - 64b address routed |  | NPR | n | 7 | y |
| 234 | 1 | 1 | 1 | 0 | 1 | 0 | 1 | 0 | Reserved - 64b address routed |  | NPR | n | 7 | y |
| 235 | 1 | 1 | 1 | 0 | 1 | 0 | 1 | 1 | Reserved - 64b address routed |  | NPR | n | 7 | y |
| 236 | 1 | 1 | 1 | 0 | 1 | 1 | 0 | 0 | Reserved - 64b address routed |  | NPR | n | 7 | y |
| 237 | 1 | 1 | 1 | 0 | 1 | 1 | 0 | 1 | Reserved - 64b address routed |  | NPR | n | 7 | y |
| 238 | 1 | 1 | 1 | 0 | 1 | 1 | 1 | 0 | Reserved - 64b address routed |  | NPR | n | 7 | y |
| 239 | 1 | 1 | 1 | 0 | 1 | 1 | 1 | 1 | Reserved - 64b address routed |  | NPR | n | 7 | y |
| 240 | 1 | 1 | 1 | 1 | 0 | 0 | 0 | 0 | Reserved - ID routed |  | CPL | n | 6 | y |
| 241 | 1 | 1 | 1 | 1 | 0 | 0 | 0 | 1 | Reserved - ID routed |  | CPL | n | 6 | y |
| 242 | 1 | 1 | 1 | 1 | 0 | 0 | 1 | 0 | Reserved - ID routed |  | CPL | n | 6 | y |
| 243 | 1 | 1 | 1 | 1 | 0 | 0 | 1 | 1 | Reserved - ID routed |  | CPL | n | 6 | y |
| 244 | 1 | 1 | 1 | 1 | 0 | 1 | 0 | 0 | Reserved - ID routed |  | CPL | Length | 6 | y |
| 245 | 1 | 1 | 1 | 1 | 0 | 1 | 0 | 1 | Reserved - ID routed |  | CPL | Length | 6 | y |
| 246 | 1 | 1 | 1 | 1 | 0 | 1 | 1 | 0 | Reserved - ID routed |  | CPL | Length | 6 | y |
| 247 | 1 | 1 | 1 | 1 | 0 | 1 | 1 | 1 | Reserved - ID routed |  | CPL | Length | 6 | y |
| 248 | 1 | 1 | 1 | 1 | 1 | 0 | 0 | 0 | Reserved - 64b address routed |  | PR | Length | 7 | y |
| 249 | 1 | 1 | 1 | 1 | 1 | 0 | 0 | 1 | Reserved - 64b address routed |  | PR | Length | 7 | y |
| 250 | 1 | 1 | 1 | 1 | 1 | 0 | 1 | 0 | Reserved - 64b address routed |  | PR | Length | 7 | y |
| 251 | 1 | 1 | 1 | 1 | 1 | 0 | 1 | 1 | Reserved - 64b address routed |  | PR | Length | 7 | y |
| 252 | 1 | 1 | 1 | 1 | 1 | 1 | 0 | 0 | Reserved - 64b address routed |  | PR | Length | 7 | y |
| 253 | 1 | 1 | 1 | 1 | 1 | 1 | 0 | 1 | Reserved - 64b address routed |  | PR | Length | 7 | y |
| 254 | 1 | 1 | 1 | 1 | 1 | 1 | 1 | 0 | Reserved - 64b address routed |  | PR | Length | 7 | y |
| 255 | 1 | 1 | 1 | 1 | 1 | 1 | 1 | 1 | Reserved - 64b address routed |  | PR | Length | 7 | y |

Turning to FIG. 13, an example extended version 1300 of a PCIe Advanced Error Reporting Extended Capability Structure is shown, which may be utilized to enable larger headers provided through flit mode PCIe (e.g., based on the potential presence of OHC-x blocks added to the headers). For instance, header log register fields may be provided (e.g., DW5-11), which are tacked on to a tradition capability structure, among other example modifications.

FIG. 14A is a flowchart 1400a illustrating an example technique for generating a packet within a flit-mode of a PCIe-based interconnect. For instance, the device may prepare a packet in connection with a transaction, such as sending a request or message or responding with a completion or other response, among other examples. A corresponding type of the packet may be determined 1405 based on the nature or type of transaction and corresponding packet may be generated 1410. For instance, in a PCIe flit mode, the packet may be generated to include a packet header that includes a header base with fields, which may be used to identify (e.g., in the first DW of the header base) the entire length of the packet to assist the receiving device in parsing the packet. For instance, the header base may include a type field (e.g., to replace the format and type fields of earlier generation PCIe TLP headers) and a header content field to identify which of a set of defined header content blocks (if any) are to be appended to the header base to form the header of the flit mode TLP, as well as other fields, such as a tag field, length field, trailer size field, and others. The device may send 1415 the formed packet on a link to another device using a port of the sending device. In some implementations, the link, when operating in flit mode, encodes data on the link utilizing PAM (e.g., PAM4) encoding.

FIG. 14B is a flowchart 1400b illustrating an example technique for parsing a received flit-mode packet in a PCIe-based interconnect. A device may receive, at a port connected to a link communicatively coupling the device to another device, a packet sent by the other device, while the link operates in a PCIe flit mode. The packet may be parsed 1425 by the receiving device based on fields included in a header base of the packet's header, the fields including a type field and a header content field. An overall length of the received packet may be determined 1430 from the fields included in the header base, such as the type field, header content field, a length field, and a trailer size field. In addition to the length of the packet, the receiving device may also determine where segments of the packet begin and end, such as the inclusion of one or more header content blocks indicated by the header content field, the end of the header, the payload, and the trailer, among other examples. From this parsing, the receiving device may process the packet, and in some cases, generate a packet embodying a corresponding response, among other examples.

Note that the apparatus', methods', and systems described above may be implemented in any electronic device or system as aforementioned. As specific illustrations, the figures below provide exemplary systems for utilizing the concepts as described herein. As the systems below are described in more detail, a number of different interconnects are disclosed, described, and revisited from the discussion above. And as is readily apparent, the advances described above may be applied to any of those interconnects, fabrics, or architectures.

Figure 15:
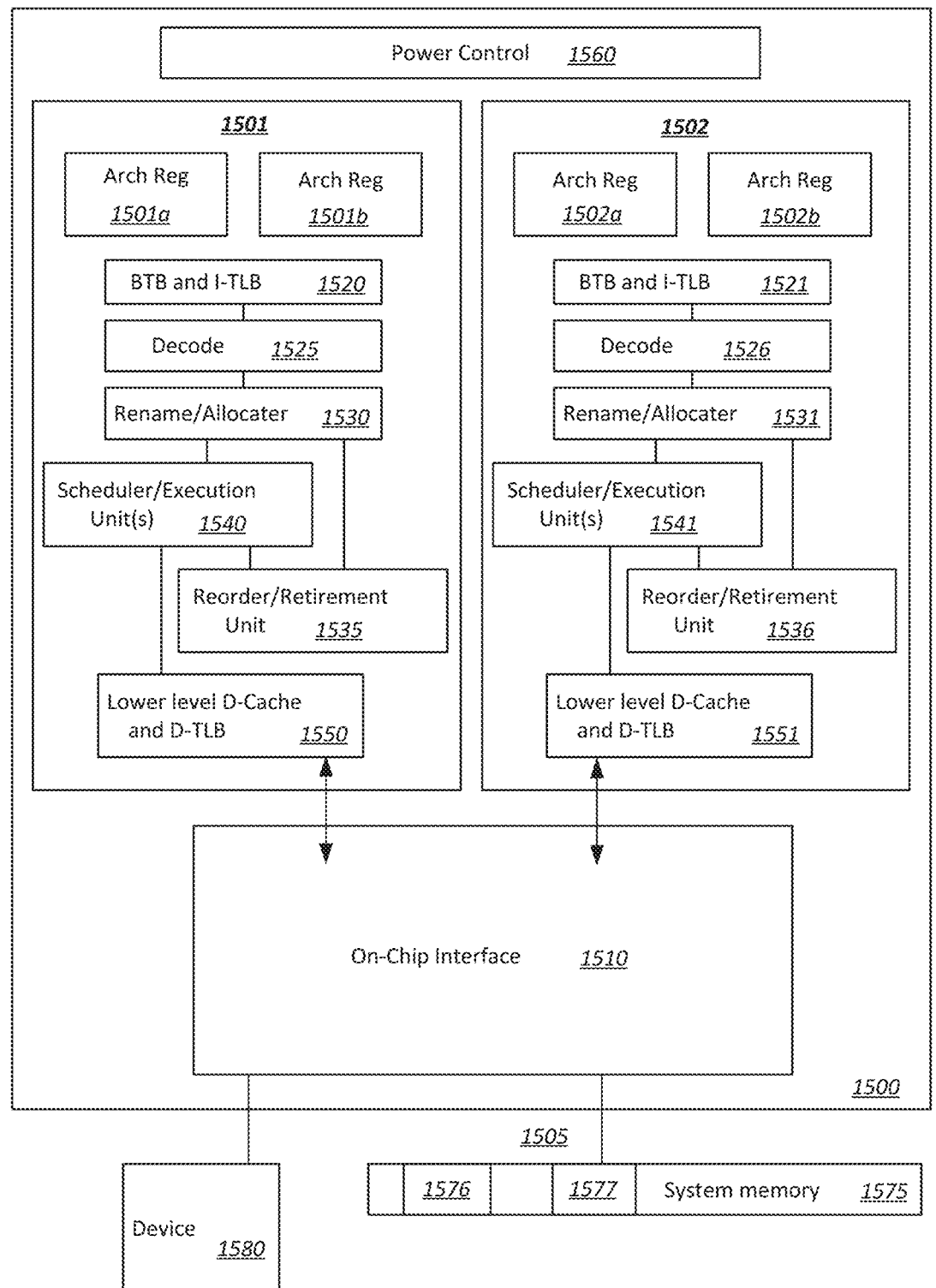
FIG. 15 illustrates an embodiment of a block diagram for a computing system including a multicore processor.

Referring to FIG. 15, an embodiment of a block diagram for a computing system including a multicore processor is depicted. Processor 1500 includes any processor or processing device, such as a microprocessor, an embedded processor, a digital signal processor (DSP), a network processor, a handheld processor, an application processor, a co-processor, a system on a chip (SOC), or other device to execute code. Processor 1500, in one embodiment, includes at least two cores—core 1501 and 1502, which may include asymmetric cores or symmetric cores (the illustrated embodiment). However, processor 1500 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1500, as illustrated in FIG. 15, includes two cores—core 1501 and 1502. Here, core 1501 and 1502 are considered symmetric cores, i.e. cores with the same configurations, functional units, and/or logic. In another embodiment, core 1501 includes an out-of-order processor core, while core 1502 includes an in-order processor core. However, cores 1501 and 1502 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 1501 are described in further detail below, as the units in core 1502 operate in a similar manner in the depicted embodiment.

As depicted, core 1501 includes two hardware threads 1501a and 1501b, which may also be referred to as hardware thread slots 1501a and 1501b. Therefore, software entities, such as an operating system, in one embodiment potentially view processor 1500 as four separate processors, i.e., four logical processors or processing elements capable of executing four software threads concurrently. As alluded to above, a first thread is associated with architecture state registers 1501a, a second thread is associated with architecture state registers 1501b, a third thread may be associated with architecture state registers 1502a, and a fourth thread may be associated with architecture state registers 1502b. Here, each of the architecture state registers (e.g., 1501*a*, 1501*b*, 1502*a*, and 1502*b*) may be referred to as processing elements, thread slots, or thread units, as described above. As illustrated, architecture state registers 1501*a* are replicated in architecture state registers 1501*b*, so individual architecture states/contexts are capable of being stored for logical processor 1501*a* and logical processor 1501*b*. In core 1501, other smaller resources, such as instruction pointers and renaming logic in allocator and renamer block 1530 may also be replicated for threads 1501*a* and 1501*b*. Some resources, such as re-order buffers in reorder/retirement unit 1535, ILTB 1520, load/store buffers, and queues may be shared through partitioning. Other resources, such as general purpose internal registers, page-table base register(s), low-level data-cache and data-TLB 1515, execution unit(s) 1540, and portions of out-of-order unit 1535 are potentially fully shared.

Processor 1500 often includes other resources, which may be fully shared, shared through partitioning, or dedicated by/to processing elements. In FIG. 15, an embodiment of a purely exemplary processor with illustrative logical units/resources of a processor is illustrated. Note that a processor may include, or omit, any of these functional units, as well as include any other known functional units, logic, or firmware not depicted. As illustrated, core 1501 includes a simplified, representative out-of-order (OOO) processor core. But an in-order processor may be utilized in different embodiments. The OOO core includes a branch target buffer 1520 to predict branches to be executed/taken and an instruction-translation buffer (I-TLB) 1520 to store address translation entries for instructions.

Core 1501 further includes decode module 1525 coupled to fetch unit 1520 to decode fetched elements. Fetch logic, in one embodiment, includes individual sequencers associated with thread slots 1501*a*, 1501*b*, respectively. Usually core 1501 is associated with a first ISA, which defines/specifies instructions executable on processor 1500. Often machine code instructions that are part of the first ISA include a portion of the instruction (referred to as an opcode), which references/specifies an instruction or operation to be performed. Decode logic 1525 includes circuitry that recognizes these instructions from their opcodes and passes the decoded instructions on in the pipeline for processing as defined by the first ISA. For example, as discussed in more detail below decoders 1525, in one embodiment, include logic designed or adapted to recognize specific instructions, such as transactional instruction. As a result of the recognition by decoders 1525, the architecture or core 1501 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1526, in one embodiment, recognize the same ISA (or a subset thereof). Alternatively, in a heterogeneous core environment, decoders 1526 recognize a second ISA (either a subset of the first ISA or a distinct ISA).

In one example, allocator and renamer block 1530 includes an allocator to reserve resources, such as register files to store instruction processing results. However, threads 1501*a* and 1501*b* are potentially capable of out-of-order execution, where allocator and renamer block 1430 also reserves other resources, such as reorder buffers to track instruction results. Unit 1530 may also include a register renamer to rename program/instruction reference registers to other registers internal to processor 1500. Reorder/retirement unit 1535 includes components, such as the reorder buffers mentioned above, load buffers, and store buffers, to support out-of-order execution and later in-order retirement of instructions executed out-of-order.

Scheduler and execution unit(s) block 1540, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1550 are coupled to execution unit(s) 1540. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1501 and 1502 share access to higher-level or further-out cache, such as a second level cache associated with on-chip interface 1510. Note that higher-level or further-out refers to cache levels increasing or getting further way from the execution unit(s). In one embodiment, higher-level cache is a last-level data cache—last cache in the memory hierarchy on processor 1500—such as a second or third level data cache. However, higher level cache is not so limited, as it may be associated with or include an instruction cache. A trace cache—a type of instruction cache—instead may be coupled after decoder 1525 to store recently decoded traces. Here, an instruction potentially refers to a macro-instruction (i.e. a general instruction recognized by the decoders), which may decode into a number of micro-instructions (micro-operations).

In the depicted configuration, processor 1500 also includes on-chip interface module 1510. Historically, a memory controller, which is described in more detail below, has been included in a computing system external to processor 1500. In this scenario, on-chip interface 1510 is to communicate with devices external to processor 1500, such as system memory 1575, a chipset (often including a memory controller hub to connect to memory 1575 and an I/O controller hub to connect peripheral devices), a memory controller hub, a northbridge, or other integrated circuit. And in this scenario, bus 1505 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1575 may be dedicated to processor 1500 or shared with other devices in a system. Common examples of types of memory 1575 include DRAM, SRAM, non-volatile memory (NV memory), and other known storage devices. Note that device 1580 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1500. For example, in one embodiment, a memory controller hub is on the same package and/or die with processor 1500. Here, a portion of the core (an on-core portion) 1510 includes one or more controller(s) for interfacing with other devices such as memory 1575 or a graphics device 1580. The configuration including an interconnect and controllers for interfacing with such devices is often referred to as an on-core (or un-core configuration). As an example, on-chip interface 1510 includes a ring interconnect for on-chip communication and a high-speed serial point-to-point link 1505 for off-chip communication. Yet, in the SOC environment, even more devices, such as the network interface, co-processors, memory 1575, graphics processor 1580, and any other known computer devices/interface may be integrated on a single die or integrated circuit to provide small form factor with high functionality and low power consumption.

In one embodiment, processor 1500 is capable of executing a compiler, optimization, and/or translator code 1577 to compile, translate, and/or optimize application code 1576 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 16:
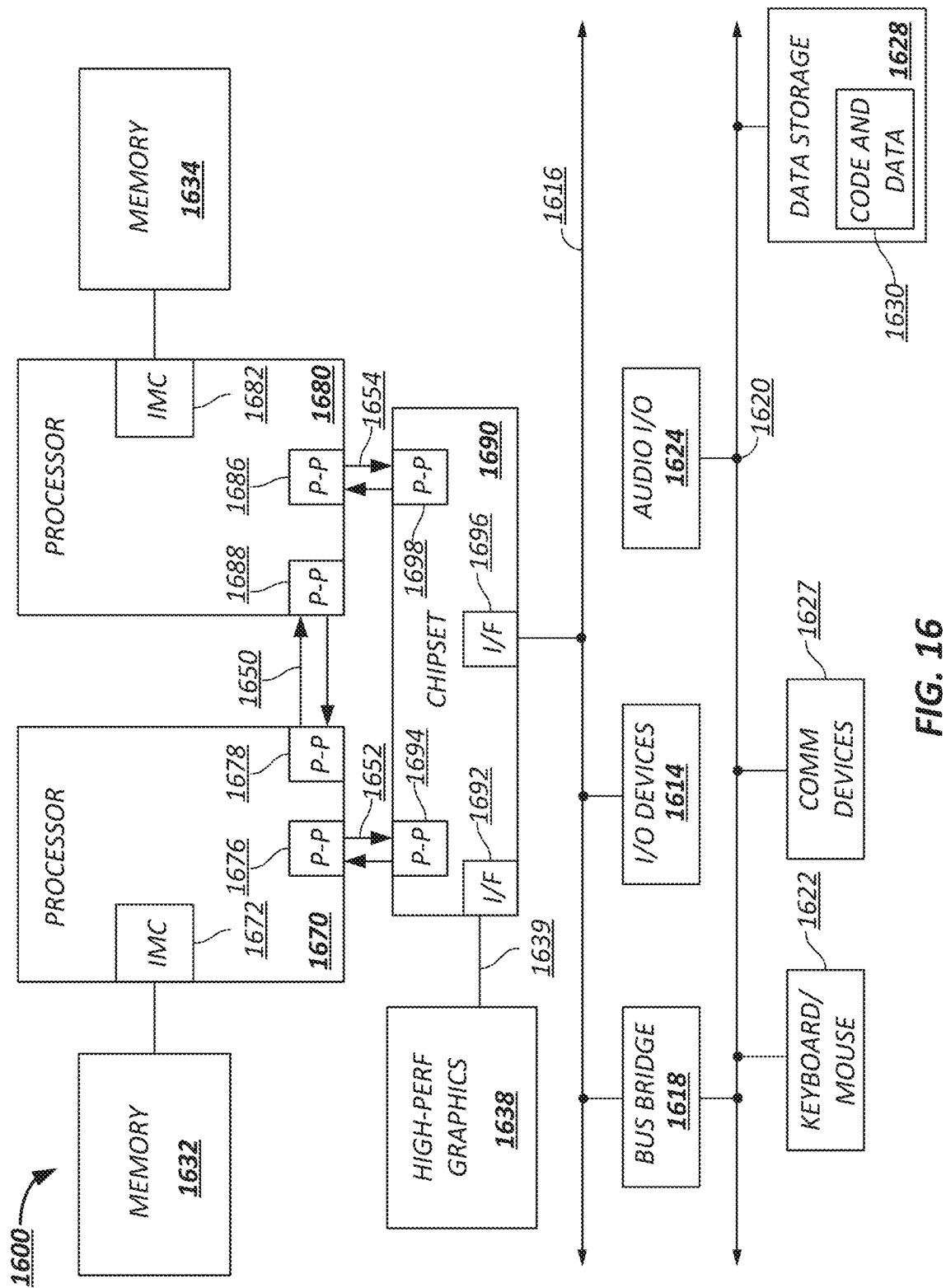
FIG. 16 illustrates another embodiment of a block diagram for a computing system.

Referring now to FIG. 16, shown is a block diagram of a second system 1600 in accordance with an embodiment of the present disclosure. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of a processor. In one embodiment, 1652 and 1654 are part of a serial, point-to-point coherent interconnect fabric.

While shown with only two processors 1670, 1680, it is to be understood that the scope of the present disclosure is not so limited. In other embodiments, one or more additional processors may be present in a given processor.

Processors 1670 and 1680 are shown including integrated memory controller units 1672 and 1682, respectively. Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 each exchange information with a chipset 1690 via individual P-P interfaces 1652, 1654 using point to point interface circuits 1676, 1694, 1686, 1698. Chipset 1690 also exchanges information with a high-performance graphics circuit 1638 via an interface circuit 1692 along a high-performance graphics interconnect 1639.

A shared cache (not shown) may be included in either processor or outside of both processors; yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present disclosure is not so limited.

As shown in FIG. 16, various I/O devices 1614 are coupled to first bus 1616, along with a bus bridge 1618 which couples first bus 1616 to a second bus 1620. In one embodiment, second bus 1620 includes a low pin count (LPC) bus. Various devices are coupled to second bus 1620 including, for example, a keyboard and/or mouse 1622, communication devices 1627 and a storage unit 1628 such as a disk drive or other mass storage device which often includes instructions/code and data 1630, in one embodiment. Further, an audio I/O 1624 is shown coupled to second bus 1620. Note that other architectures are possible, where the included components and interconnect architectures vary. For example, instead of the point-to-point architecture of FIG. 16, a system may implement a multi-drop bus or other such architecture.

Computing systems can include various combinations of components. These components may be implemented as ICs, portions thereof, discrete electronic devices, or other modules, logic, hardware, software, firmware, or a combination thereof adapted in a computer system, or as components otherwise incorporated within a chassis of the computer system. However, it is to be understood that some of the components shown may be omitted, additional components may be present, and different arrangement of the components shown may occur in other implementations. As a result, the solutions described above may be implemented in any portion of one or more of the interconnects illustrated or described below.

A processor, in one embodiment, includes a microprocessor, multi-core processor, multithreaded processor, an ultra-low voltage processor, an embedded processor, or other known processing element. In the illustrated implementation, processor acts as a main processing unit and central hub for communication with many of the various components of the system. As one example, processor is implemented as a system on a chip (SoC). As a specific illustrative example, processor includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instruction set that performs defined algorithms as set forth by the processor licensor. Here, the microarchitectural implementation may vary, but the architectural function of the processor is usually consistent. Certain details regarding the architecture and operation of processor in one implementation will be discussed further below to provide an illustrative example.

Processor, in one embodiment, communicates with a system memory. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (13P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage may also couple to processor. In various embodiments, to enable a thinner and lighter system design as well as to improve system responsiveness, this mass storage may be implemented via an SSD. However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. A flash device may be coupled to processor, e.g., via a serial peripheral interface (SPI). This flash device may provide for non-volatile storage of system software, including a basic input/output software (BIOS) as well as other firmware of the system.

In various embodiments, mass storage of the system is implemented by an SSD alone or as a disk, optical or other drive with an SSD cache. In some embodiments, the mass storage is implemented as an SSD or as an HDD along with a restore (RST) cache module. In various implementations, the HDD provides for storage of between 320 GB-4 terabytes (TB) and upward while the RST cache is implemented with an SSD having a capacity of 24 GB-256 GB. Note that such SSD cache may be configured as a single level cache (SLC) or multi-level cache (MLC) option to provide an appropriate level of responsiveness. In an SSD-only option, the module may be accommodated in various locations such as in a mSATA or NGFF slot. As an example, an SSD has a capacity ranging from 120 GB-1 TB.

Various peripheral devices may couple to processor via a low pin count (LPC) interconnect. In the embodiment shown, various components can be coupled through an embedded controller. Such components can include a keyboard (e.g., coupled via a PS2 interface), a fan, and a thermal sensor. In some embodiments, touch pad may also couple to EC via a PS2 interface. In addition, a security processor such as a trusted platform module (TPM) in accordance with the Trusted Computing Group (TCG) TPM Specification Version 1.2, dated Oct. 2, 2003, may also couple to processor via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full-size SD-XC card reader and/or a SIM card reader for WWAN (e.g., an 8-pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System can communicate with external devices in a variety of manners, including wirelessly. In some instances, various wireless modules, each of which can correspond to a radio configured for a particular wireless communication protocol, are present. One manner for wireless communication in a short range such as a near field may be via a near field communication (NFC) unit which may communicate, in one embodiment with processor via an SMBus. Note that via this NFC unit, devices in close proximity to each other can communicate. For example, a user can enable system to communicate with another (e.g.,) portable device such as a smartphone of the user via adapting the two devices together in close relation and enabling transfer of information such as identification information payment information, data such as image data or so forth. Wireless power transfer may also be performed using an NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

Further, additional wireless units can include other short-range wireless engines including a WLAN unit and a Bluetooth unit. Using WLAN unit, Wi-Fi™ communications in accordance with a given Institute of Electrical and Electronics Engineers (IEEE) 802.11 standard can be realized, while via Bluetooth unit, short range communications via a Bluetooth protocol can occur. These units may communicate with processor via, e.g., a USB link or a universal asynchronous receiver transmitter (UART) link. Or these units may couple to processor via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit which in turn may couple to a subscriber identity module (SIM). In addition, to enable receipt and use of location information, a GPS module may also be present. WWAN unit and an integrated capture device such as a camera module may communicate via a given USB protocol such as a USB 2.0 or 3.0 link, or a UART or I²C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11 ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition, NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high-resolution camera, e.g., having a resolution of at least 2.0 megapixels (MP) and extending to 6.0 MP and beyond.

To provide for audio inputs and outputs, an audio processor can be implemented via a digital signal processor (DSP), which may couple to processor via a high definition audio (HDA) link. Similarly, DSP may communicate with an integrated coder/decoder (CODEC) and amplifier that in turn may couple to output speakers which may be implemented within the chassis. Similarly, amplifier and CODEC can be coupled to receive audio inputs from a microphone which in an embodiment can be implemented via dual array microphones (such as a digital microphone array) to provide for high quality audio inputs to enable voice-activated control of various operations within the system. Note also that audio outputs can be provided from amplifier/CODEC to a headphone jack.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC may be sent to the PCH instead of the processor during the connected standby state so that the PCH can manage the wakeup processing instead of the processor. In addition, the TSC is maintained in the PCH to facilitate sustaining processor architectural functions.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

While the concepts above have been described with respect to a limited number of embodiments, those skilled in the art will appreciate numerous modifications and variations therefrom. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The following examples pertain to embodiments in accordance with this Specification. Example 1 is an apparatus including: a port to couple to a link; protocol circuitry to implement a layered protocol stack, where the protocol circuitry is to: determine a packet type for a packet; generate the packet, where the packet includes a packet header, the packet header includes a header base, and the header base includes a type field and a header content field, where the type field includes indicates the packet type, the header content field indicates which of a plurality of header content blocks is to be included in the packet header with the header base, where information in fields of the header base indicate a total length of the packet, where the port is to send the packet on the link to another device.

Example 2 includes the subject matter of example 1, where each of the plurality of header content blocks is used to identify different respective information associated with the packet, and the header content field indicates inclusion of either none of the plurality of header content blocks, a subset of the plurality of header content blocks, or all of the plurality of header content blocks in the header.

Example 3 includes the subject matter of example 2, where the header content field uses one-hot encoding to identify which of the plurality of header content blocks are to be included in the packet.

Example 4 includes the subject matter of any one of examples 2-3, where the plurality of header content blocks include a first header content block to indicate a byte enable value and a process address space identifier (PASID), a second header content block to identify segment information for the packet, a third header content block to identify data encryption information for the packet, and a fourth header content block for vendor-defined information.

Example 5 includes the subject matter of any one of examples 1-4, where each of the plurality of header content blocks includes an integer multiple of one double word (DW).

Example 6 includes the subject matter of example 5, where a particular one of the plurality of header content blocks includes a variable length header content block and the length of the particular header content block is to be indicated in the header content field.

Example 7 includes the subject matter of example 6, where the length of the particular header content block is selected from a 1DW length, 2 DW length, or 4DW length.

Example 8 includes the subject matter of any one of examples 1-7, where the packet is compliant with a Peripheral Component Interconnect Express (PCIe)-based protocol.

Example 9 includes the subject matter of example 8, where the packet is to be used in a PCIe flit mode, where a different PCIe packet format is to be used in a non-flit mode.

Example 10 includes the subject matter of example 9, where the packet format of the non-flit mode includes a packet header format with a format field, a byte enable field, and a type field shorter than the type field of the flit mode packet header, and does not include the header content field.

Example 11 includes the subject matter of any one of examples 9-10, where the flit mode utilizes PAM encoding and the non-flit mode utilizes non-return-to-zero (NRZ) encoding.

Example 12 includes the subject matter of any one of examples 1-11, where the header base further includes a trailer size field to indicate whether a trailer is included in the packet.

Example 13 includes the subject matter of any one of examples 1-12, where the header base is either 3 double words (DW) or 4DW in length based on a type of the packet, and each one of the plurality of header content blocks includes a respective length of an integer multiple of 1DW.

Example 14 is an apparatus including: a port including a receiver to receive a packet from another device over a link, where the packet includes a packet header, the packet header includes a header base, and the header base includes a type field and a header content field; and protocol circuitry to: parse the packet based on the header base; determine a length of the packet from at least the type field and the header content field; and identify a particular header content block included in the header based on a value of the header content field.

Example 15 includes the subject matter of example 14, where the link is based on a Peripheral Component Interconnect Express (PCIe)-based protocol and utilizes pulse amplitude modulation (PAM) encoding.

Example 16 includes the subject matter of any one of examples 14-15, where the header content field includes a value to indicate that a subset of a plurality of defined header content blocks is included in the packet header, where the subset of header content blocks includes the particular header content block.

Example 17 includes the subject matter of example 16, where the header base is either 3 double words (DW) or 4DW in length based on a type of the packet, and each one of the plurality of header content blocks includes a respective length of an integer multiple of 1DW.

Example 18 includes the subject matter of any one of examples 14-17, where the length is determined from fields in a first DW of the header base, and the fields in the first DW of the header base include: the type field; the header content field; a trailer size field; and a length field.

Example 19 includes the subject matter of example 18, where the trailer size field is to indicate whether a trailer is included in the packet.

Example 20 includes the subject matter of any one of examples 14-19, where each of the plurality of header content blocks is used to identify different respective information associated with the packet, and the header content field indicates inclusion of either none of the plurality of header content blocks, a subset of the plurality of header content blocks, or all of the plurality of header content blocks in the header.

Example 21 includes the subject matter of example 20, where the header content field uses one-hot encoding to identify which of the plurality of header content blocks are to be included in the packet.

Example 22 includes the subject matter of any one of examples 20-21, where the plurality of header content blocks include a first header content block to indicate a byte enable value and a process address space identifier (PASID), a second header content block to identify segment information for the packet, a third header content block to identify data encryption information for the packet, and a fourth header content block for vendor-defined information.

Example 23 includes the subject matter of any one of examples 14-22, where each of the plurality of header content blocks includes an integer multiple of one double word (DW).

Example 24 includes the subject matter of example 23, where a particular one of the plurality of header content blocks includes a variable length header content block and the length of the particular header content block is to be indicated in the header content field.

Example 25 includes the subject matter of example 24, where the length of the particular header content block is selected from a 1DW length, 2 DW length, or 4DW length.

Example 26 includes the subject matter of any one of examples 14-25, where the packet is compliant with a Peripheral Component Interconnect Express (PCIe)-based protocol.

Example 27 includes the subject matter of example 26, where the packet is to be used in a PCIe flit mode, where a different PCIe packet format is to be used in a non-flit mode.

Example 28 includes the subject matter of example 27, where the packet format of the non-flit mode includes a packet header format with a format field, a byte enable field, and a type field shorter than the type field of the flit mode packet header, and does not include the header content field.

Example 29 includes the subject matter of any one of examples 27-28, where the flit mode utilizes PAM encoding and the non-flit mode utilizes non-return-to-zero (NRZ) encoding.

Example 30 is a system including: a first device; and a second device coupled to the first device by a link, where the second device includes protocol circuitry to: determine a packet type for a packet to be sent on the link; generate the packet, where the packet includes a packet header, the packet header includes a header base, and the header base includes a type field and a header content field, where the type field indicates the packet type, the header content field indicates which of a plurality of different header content blocks is to be included in the packet header with the header base, information in fields of the header base indicate a total length of the packet, and the second device is to send the packet on the link to the first device.

Example 31 includes the subject matter of example 30, where the link is based on a Peripheral Component Interconnect Express (PCIe)-based protocol and utilizes pulse amplitude modulation (PAM) encoding.

Example 32 includes the subject matter of example 31, where the first and second devices includes logic to communicate over the link in either a flit mode or a non-flit mode, the flit mode utilizes the PAM encoding, the non-flit mode utilizes non-return-to-zero (NRZ) encoding, the packet is based on a flit-mode packet format, and a different packet format is used in the non-flit mode.

Example 33 includes the subject matter of example 32, where the packet format of the non-flit mode includes a packet header format with a format field, a byte enable field, and a type field shorter than the type field of the flit mode packet header, and does not include the header content field.

Example 34 includes the subject matter of any one of examples 30-33, where the second device includes a processor and the first device includes one of a graphics card or a solid state drive.

Example 35 includes the subject matter of any one of examples 30-34, where each of the plurality of header content blocks is used to identify different respective information associated with the packet, and the header content field indicates inclusion of either none of the plurality of header content blocks, a subset of the plurality of header content blocks, or all of the plurality of header content blocks in the header.

Example 36 includes the subject matter of example 35, where the header content field uses one-hot encoding to identify which of the plurality of header content blocks are to be included in the packet.

Example 37 includes the subject matter of any one of examples 35-36, where the plurality of header content blocks include a first header content block to indicate a byte enable value and a process address space identifier (PASID), a second header content block to identify segment information for the packet, a third header content block to identify data encryption information for the packet, and a fourth header content block for vendor-defined information.

Example 38 includes the subject matter of any one of examples 30-37, where each of the plurality of header content blocks includes an integer multiple of one double word (DW).

Example 39 includes the subject matter of example 38, where a particular one of the plurality of header content blocks includes a variable length header content block and the length of the particular header content block is to be indicated in the header content field.

Example 40 includes the subject matter of example 39, where the length of the particular header content block is selected from a 1DW length, 2 DW length, or 4DW length.

Example 41 includes the subject matter of any one of examples 30-40, where the header base further includes a trailer size field to indicate whether a trailer is included in the packet.

Example 42 includes the subject matter of any one of examples 30-41, where the header base is either 3 double words (DW) or 4DW in length based on a type of the packet, and each one of the plurality of header content blocks includes a respective length of an integer multiple of 1DW.

Example 43 is a method including: determining a packet type for a packet to be sent from a first device to a second device on a link; generating the packet at the first device, where the packet includes a packet header, the packet header includes a header base, and the header base includes a type field and a header content field, where the type field indicates the packet type, the header content field indicates which of a plurality of header content blocks is to be included in the packet header with the header base, where information in fields of the header base indicate a total length of the packet; and sending the packet on the link to second device.

Example 44 includes the subject matter of example 43, where each of the plurality of header content blocks is used to identify different respective information associated with the packet, and the header content field indicates inclusion of either none of the plurality of header content blocks, a subset of the plurality of header content blocks, or all of the plurality of header content blocks in the header.

Example 45 includes the subject matter of example 44, where the header content field uses one-hot encoding to identify which of the plurality of header content blocks are to be included in the packet.

Example 46 includes the subject matter of any one of examples 44-45, where the plurality of header content blocks include a first header content block to indicate a byte enable value and a process address space identifier (PASID), a second header content block to identify segment information for the packet, a third header content block to identify data encryption information for the packet, and a fourth header content block for vendor-defined information.

Example 47 includes the subject matter of any one of examples 43-46, where each of the plurality of header content blocks includes an integer multiple of one double word (DW).

Example 48 includes the subject matter of example 47, where a particular one of the plurality of header content blocks includes a variable length header content block and the length of the particular header content block is to be indicated in the header content field.

Example 49 includes the subject matter of example 48, where the length of the particular header content block is selected from a 1DW length, 2 DW length, or 4DW length.

Example 50 includes the subject matter of any one of examples 43-49, where the packet is compliant with a Peripheral Component Interconnect Express (PCIe)-based protocol.

Example 51 includes the subject matter of example 50, where the packet is to be used in a PCIe flit mode, where a different PCIe packet format is to be used in a non-flit mode.

Example 52 includes the subject matter of example 51, where the packet format of the non-flit mode includes a packet header format with a format field, a byte enable field, and a type field shorter than the type field of the flit mode packet header, and does not include the header content field.

Example 53 includes the subject matter of any one of examples 50-52, where the flit mode utilizes PAM encoding and the non-flit mode utilizes non-return-to-zero (NRZ) encoding.

Example 54 includes the subject matter of any one of examples 43-53, where the header base further includes a trailer size field to indicate whether a trailer is included in the packet.

Example 55 includes the subject matter of any one of examples 43-54, where the header base is either 3 double words (DW) or 4DW in length based on a type of the packet, and each one of the plurality of header content blocks includes a respective length of an integer multiple of 1DW.

Example 56 is a system including means to perform the method of any one of examples 43-55.

Example 57 is a method including: receiving a packet at a port of a first device from another device over a link, where the packet includes a packet header, the packet header includes a header base, and the header base includes a type field and a header content field; and parsing the packet based on the header base; determining a length of the packet from at least the type field and the header content field; and identifying a particular header content block included in the header based on a value of the header content field.

Example 58 includes the subject matter of example 57, where the link is based on a Peripheral Component Interconnect Express (PCIe)-based protocol and utilizes pulse amplitude modulation (PAM) encoding.

Example 59 includes the subject matter of any one of examples 57-58, where the header content field includes a value to indicate that a subset of a plurality of defined header content blocks is included in the packet header, where the subset of header content blocks includes the particular header content block.

Example 60 includes the subject matter of example 59, where the header base is either 3 double words (DW) or 4DW in length based on a type of the packet, and each one of the plurality of header content blocks includes a respective length of an integer multiple of 1DW.

Example 61 includes the subject matter of any one of examples 57-60, where the length is determined from fields in a first DW of the header base, and the fields in the first DW of the header base include: the type field; the header content field; a trailer size field; and a length field.

Example 62 includes the subject matter of example 61, where the trailer size field is to indicate whether a trailer is included in the packet.

Example 63 includes the subject matter of any one of examples 57-62, where each of the plurality of header content blocks is used to identify different respective information associated with the packet, and the header content field indicates inclusion of either none of the plurality of header content blocks, a subset of the plurality of header content blocks, or all of the plurality of header content blocks in the header.

Example 64 includes the subject matter of example 63, where the header content field uses one-hot encoding to identify which of the plurality of header content blocks are to be included in the packet.

Example 65 includes the subject matter of any one of examples 63-64, where the plurality of header content blocks include a first header content block to indicate a byte enable value and a process address space identifier (PASID), a second header content block to identify segment information for the packet, a third header content block to identify data encryption information for the packet, and a fourth header content block for vendor-defined information.

Example 66 includes the subject matter of any one of examples 57-65, where each of the plurality of header content blocks includes an integer multiple of one double word (DW).

Example 67 includes the subject matter of example 66, where a particular one of the plurality of header content blocks includes a variable length header content block and the length of the particular header content block is to be indicated in the header content field.

Example 68 includes the subject matter of example 67, where the length of the particular header content block is selected from a 1DW length, 2 DW length, or 4DW length.

Example 69 includes the subject matter of any one of examples 57-68, where the packet is compliant with a Peripheral Component Interconnect Express (PCIe)-based protocol.

Example 70 includes the subject matter of example 69, where the packet is to be used in a PCIe flit mode, where a different PCIe packet format is to be used in a non-flit mode.

Example 71 includes the subject matter of example 70, where the packet format of the non-flit mode includes a packet header format with a format field, a byte enable field, and a type field shorter than the type field of the flit mode packet header, and does not include the header content field.

Example 72 includes the subject matter of any one of examples 70-71, where the flit mode utilizes PAM encoding and the non-flit mode utilizes non-return-to-zero (NRZ) encoding.

Example 73 is a system including means to perform the method of any one of examples 57-72.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    a port to couple to a link, wherein the port comprises:
        protocol circuitry to implement a layered protocol stack, wherein the protocol circuitry comprises a transaction layer, a data link layer, and a physical layer, wherein the protocol circuitry is to:
            assemble a transaction layer packet in a flit mode of a Peripheral Component Interconnect Express (PCIe)-based protocol, wherein the transaction layer packet (TLP) comprises a header, the header comprises a header base, the header base comprises a type field to indicate a type of the TLP and an orthogonal header content (OHC) field, the OHC field is encoded to indicate presence of particular OHC in the header, wherein the header further comprises the particular OHC,
    wherein the port is to send the packet on the link to another device.

2. The apparatus of claim 1, wherein the particular OHC is to follow the header base in the header.

3. The apparatus of claim 1, wherein the particular OHC are selected from a defined set of OHC blocks, and each OHC block in the set of OHC blocks has a defined format.

4. The apparatus of claim 3, wherein the set of OHC blocks comprise an OHC-A block, an OHC-B block, an OHC-C block, and at least one OHC-E block.

5. The apparatus of claim 4, wherein when OHC blocks are to be included the particular OHC, the OHC blocks are to be ordered from OHC-A blocks before OHC-B blocks, OHC-B blocks before OHC-C blocks, and OHC-C blocks before OHC-E blocks.

6. The apparatus of claim 4, wherein OHC-A blocks are to comprise a Process Address Space Identifier (PASID) field.

7. The apparatus of claim 4, wherein the set of OHC blocks comprise three versions of OHC-E blocks with three different lengths.

8. The apparatus of claim 7, wherein the three versions of OHC-E blocks comprise an OHC-E1 block with a length of one double word (DW), an OHC-E2 block with a length of two DW, and an OHC-E4 block with a length of four DW.

9. The apparatus of claim 3, wherein content of the OHC blocks varies based on the TLP type identified in the type field.

10. The apparatus of claim 1, wherein the PCIe-based protocol comprises PCIe Generation 6.

11. A method comprising:
    assembling a transaction layer packet (TLP) in a flit mode of a Peripheral Component Interconnect Express (PCIe)-based protocol, wherein the TLP comprises a header, a first double word (DW) of the header comprises a type field to indicate a type of the TLP and an orthogonal header content (OHC) field, the OHC field is encoded to indicate presence of one or more OHC blocks in the header, wherein the header further comprises the one or more OHC blocks; and
    sending the TLP to another device over a link compliant with the PCIe-based protocol.

12. The method of claim 11, wherein each of the OHC blocks comprises an integer multiple of one DW.

13. The method of claim 11, wherein a different PCIe packet format is to be used in a non-flit mode.

14. The method of claim 13, wherein the packet format of the non-flit mode includes a packet header format with a format field, a byte enable field, and a type field shorter than the type field of the flit mode packet header, and does not include the OHC field.

15. The method of claim 11, wherein the header further comprises a trailer size field to indicate whether a trailer is included in the TLP.

16. A system comprising:
    a first device;
    a second device coupled to the first device by a link, wherein the second device comprises protocol circuitry to:
        receive a transaction layer packet in a flit mode of a Peripheral Component Interconnect Express (PCIe)-based protocol, wherein the transaction layer packet (TLP) comprises a header, the header comprises a type field to indicate a type of the TLP and an orthogonal header content (OHC) field, the OHC field is encoded to indicate presence of particular OHC in the header, wherein the header further comprises the particular OHC; and determine an overall length of the TLP from fields of the header base.

17. The system of claim 16, wherein the link is based on the PCIe-based protocol and utilizes pulse amplitude modulation (PAM) encoding.

18. The system of claim 17, wherein the first and second devices comprise logic to communicate over the link in either the flit mode or a non-flit mode, the non-flit mode utilizes non-return-to-zero (NRZ) encoding, and a different packet format is used in the non-flit mode.

19. The system of claim 16, wherein the header base further comprises:
 a trailer size field;
 a length field;
 a tag field; and
 an address field.

20. The system of claim 16, wherein the second device comprises a processor and the first device comprises one of a graphics card or a solid state drive.

21. The system of claim 16, wherein the protocol circuitry is further to use data in the TLP in a transaction involving memory.

* * * * *